United States Patent [19]

Yu

[11] Patent Number: 5,734,865
[45] Date of Patent: Mar. 31, 1998

[54] VIRTUAL LOCAL AREA NETWORK WELL-KNOWN PORT ROUTING MECHANISM FOR MULT--EMULATORS IN AN OPEN SYSTEM ENVIRONMENT

[75] Inventor: Kin C. Yu, Burlington, Mass.

[73] Assignee: Bull HN Information Systems Inc., Billerica, Mass.

[21] Appl. No.: 495,160

[22] Filed: Jun. 27, 1995

Related U.S. Application Data

[63] Continuation-in-part of Ser. No. 473,476, Jun. 7, 1995, Pat. No. 5,636,371.

[51] Int. Cl.⁶ .............. G06F 13/00; G06F 15/163; G06F 15/177
[52] U.S. Cl. .............. 395/500; 395/200.02; 395/681; 395/682; 395/684; 364/242.94; 364/242.95; 364/242.96; 364/DIG. 1; 370/254
[58] Field of Search .............. 395/500, 200.02, 395/680, 684, 575, 681, 682; 370/230, 231, 399, 404, 397, 254; 364/242.94, 242.95, 242.96, DIG. 1

[56] References Cited

U.S. PATENT DOCUMENTS

| | | | |
|---|---|---|---|
| 5,111,384 | 5/1992 | Aslanian | 395/575 |
| 5,271,010 | 12/1993 | Miyake et al. | 370/392 |
| 5,313,454 | 5/1994 | Bustini et al. | 370/231 |
| 5,339,435 | 8/1994 | Lubkin et al. | 395/701 |

*Primary Examiner*—Kevin J. Teska
*Assistant Examiner*—Thai Phan

*Attorney, Agent, or Firm*—Faith F. Driscoll; John S. Solakian

[57] ABSTRACT

A local host data processing system operating under the control of a local host operating system includes components of multiple emulating hosted operating systems. The host operating system further include a TCP/IP network protocol stack which couples to the communications facilities of the host system connected to a local area network for communicating with a number of remote host systems. Host and hosted operating systems share the same TCP/IP network protocol stack. A virtual network mechanism is configured within the local host system to be operatively coupled to the host network protocol stack and provide access to well-known port application programs. When so configured, the mechanism functions as another LAN to which multiple virtual host systems are attached for executing applications under control of the emulating hosted operating systems. The mechanism transforms the well-known port identifier of each inbound packet into a non-well-known port identifier in addition to other station address identifier fields. It then redirects the transformed packet back to the IP layer of the stack for transfer to the appropriate well-known port application program being run by the hosted operating system of the particular virtual host system. The mechanism reverses this operation for each reply packet which it redirects back to the IP layer for forwarding to the remote system. This eliminates the need to specify additional protocol stacks and to provide additional communication hardware facilities for handling multiple instances of well-known port applications programs running on the different virtual host/multiple hosted operating systems.

20 Claims, 15 Drawing Sheets

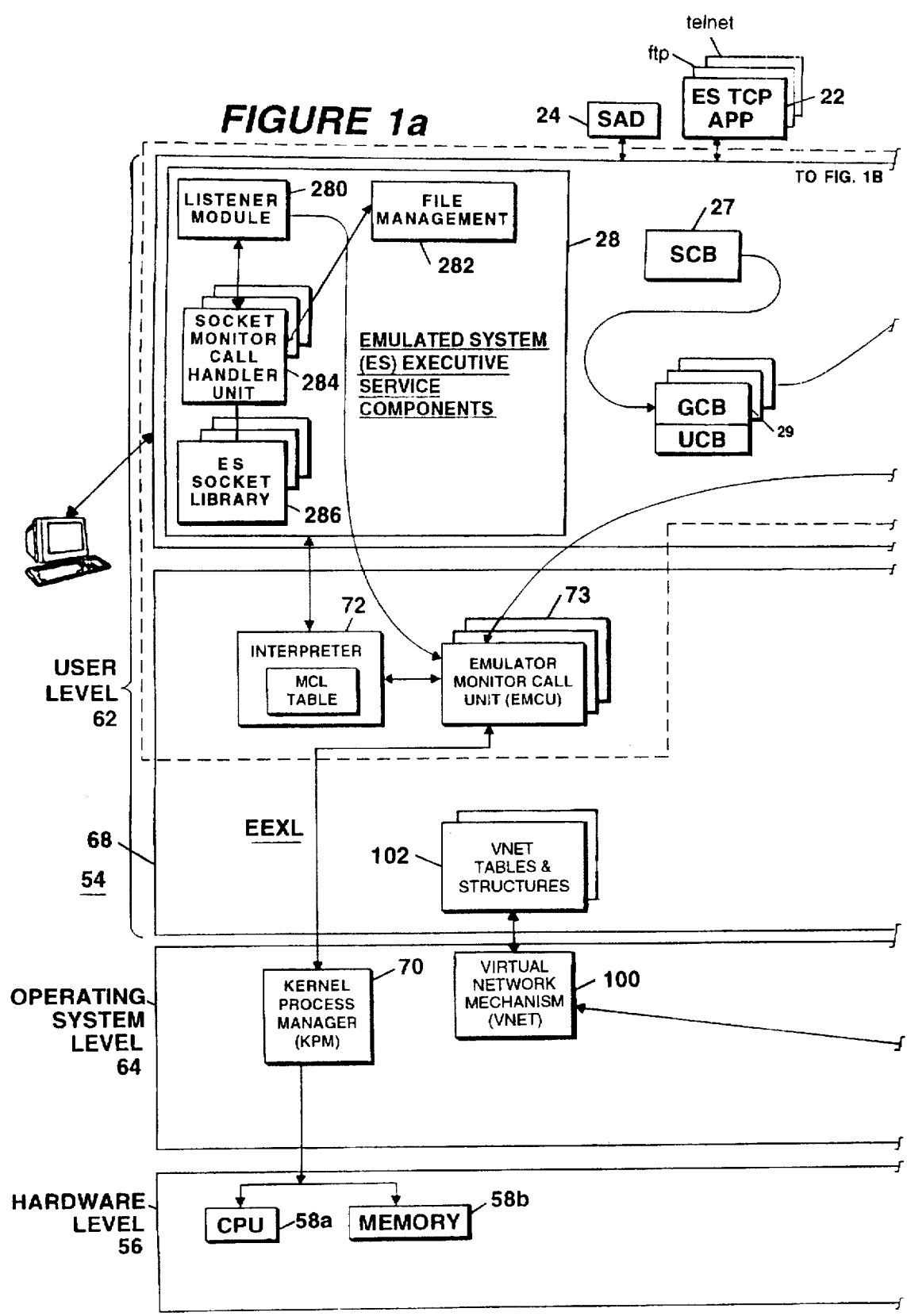

```
struct ifnet {
    char        *if_name;           /* virtual host name, e.g. "ve0", "ve1", "ve2"
                                       or "ve3" */
    short       if_unit;            /* integer, 0-3 used to locate the
                                       ve_softc structure */
    u_long      if_mtu;             /* maximum transmission unit*/
    long        if_flags            /* up/down, broadcast, etc. */
    short       if_timer            /* time til if_watchdog timer called*/
    int         if_metric           /* routing metric (external only) */
    struct      ifaddr *if_addrlist; /*linked list of addresses per if */
    struct      ifqueue {
                struct  mbuf *ifq_tail;
                int     ofq_q;em;
                int     ifq_maxlen;
                int     ifq_drops;
    } if_snd;                       /*output queue*/
/* procedure handles */
    int         (*if_init) ();      /* init routine */
    int         (*if_output) ()     /* output routine (enqueue) */
    int         (*if_start) ()      /* initiate output routine */
    int         (*if_done) ()       /* output complete routine */
    int         (*if_ioctl) ()      /* ioctl routine */
    int         (*if_reset) ()      /* bus reset routine */
    int         (*if_watchdog) ()   /* timer routine */
/*generic interface statistics */
    int         if_ipackets;        /*packets received on interface */
    int         if_ierrors;         /* input errors on interface */
    int         if_opackets;        /* packets sent on interface */
    int         if_collisions;      /* collisions on csma interfaces */
/*end statistics */
    struct      ifnet *if_next;
    u_char      if_type;            /* ethernet, token ring, etc. */
    u_char      if_addrlen;         /* media address length */
    u_char      if_hdrlen;          /* media header length */
    u_char      if_index;           /* numeric abbreviation for this if */
/*more statistics here to avoid recompiling netstat */
    struct      timeval if_last change;  /* last updated */
    int         if_ibytes;          /* total number of octets received */
    int         if_obytes;          /* total number of octets sent */
    int         if_imcasts;         /* packets received via multicast */
    int         if_omcasts;         /* packets sent via multicast */
    int         if_iqdrops;         /* dropped on input, this interface */
    int         if_noproto;         /* destined for unsupported protocol */
    int         if_baudrate;        /* linespeed */
```

FIGURE 7c

(1) INITIATES THE CONNECTION PACKET
(2) VIRNET MECH MAPS AND ROUTES PACKET TO ES FTP SERVER
(3) ES FTP SERVER RESPONSE PACKET
(4) VIRNET MECH REMAPS AND SENDS PACKET TO REMOTE HOST

VIRTUAL LOCAL AREA NETWORK WELL-KNOWN PORT ROUTING MECHANISM FOR MULT--EMULATORS IN AN OPEN SYSTEM ENVIRONMENT

This is a continuation-in-part of patent application Ser. No. 08/473,476, filed on Jun. 7, 1995, now U.S. Pat. No. 5,636,371, issued on Jun. 3, 1997, entitled, "Virtual Network Mechanism to Access Well Known Port Application Programs Running on a Single Host System", invented by Kin C. Yu, U.S. Pat. No. 5,636,371.

RELATED PATENT APPLICATIONS

1. The patent application of Richard S. Bianchi, Dennis R. Flynn, Marcia T. Fogelgren, Richard A. Lemay, Mary E. Toyell and William E. Woods entitled, "Executing Programs of a First System on a Second System," filed on Sep. 28, 1993 bearing Ser. No. 08/128,456 which is assigned to the same assignee as this patent application.

2. The patent application of Kin C. Yu and John L. Curlcy entitled, "Sockets Application Program Mechanism for Proprietary Based Application Programs Running in an Emulation Environment," filed on Mar. 30, 1995, bearing Ser. No. 08/413,333 which is assigned to the same assignee as this patent application.

BACKGROUND OF THE INVENTION

1. Field of Use

The present invention generally relates to methods and mechanisms for conducting internetwork communications. More particularly, the present invention relates to methods and mechanisms used by a computer system which executes application programs originally developed to run on another computer system and provides network facilities to carry out communications over a network with other computer systems.

2. Related Art

With the advent of open system platforms which operate under the control of versions of the UNIX operating system, it becomes more and more desirable to be able to efficiently run application programs developed for earlier computer systems, such as proprietary based systems on such open systems without having to rewrite or port such application programs. A computer system which accommodates such application programs is described in related copending patent application of Richard S. Bianchi, Dennis R. Flynn, Marcia T. Fogelgren, Richard A. Lemay, Mary E. Tovell and William E. Woods entitled, "Executing Programs of a First System on a Second System."

Generally, such application programs are required to operate in conjunction with and communicate with other computer systems over internetworks. Many of these computer systems utilized standard communication network protocols, such as TCP/IP, which are normally implemented as part of the computer system's operating system (i.e., kernel). Also, such computer systems generally support multiuser environments in which it was possible for more than one user process at a time to be using such networking facilities. To implement this, the communication protocol implementation required the adoption of a method for identifying the data associated with each user process. That is, when a client process wanted to contact a server process, such as FTP or Telenet, the client process must have a way of identifying the server process that it wants to use. In TCP/IP, if the client process knows the 32-bit Internet address of the host computer on which the server resides, it can contact that host. But, the client process must still have some way of identifying that particular server process.

To solve this problem, the TCP protocol defined a group of well-known ports or well-known addresses which identify the well-known services that a host computer can provide. For example, most TCP/IP implementations provide a file transfer server named FTP that a client process can utilize to transfer a file via a network to another computer system. The 16 bit integer port established for FTP is 21 (decimal). Thus, every TCP/IP implementation that supports FTP, must assign the well-known port of 21 (decimal) to that server.

While this solved the problem of identifying well-known services, the utilization of this convention creates problems where a computer system which implements TCP/IP and supports FTP is required to run multiple well-known port application programs associated with different operating systems components which share a common host communications protocol stack. Here, the well-known application programs associated with the different operating system components, such as those of an emulator and host system are both required to utilize the same identical well-known ports in identifying like application program services. This gives rise to a naming conflict between the different application program services.

Relative to problems relating to process migration, one author has observed that support for process migration is a characteristic that is increasingly important. Protocols such as OSI, X.25 and TCP/IP that use such machine addresses to identify processes make migration difficult because a process cannot take its address with it when it moves. The author describes the use of a new custom protocol called a Fast Local Internet Protocol (FLIP) and an architecture which permits servers to migrate to new machines without requiring any manual reconfiguration, such as TCP/IP requires. For further information regarding this protocol, reference may be made to a section 14.5 entitled, "Communication in Amoeba" of the text entitled, "Modern Operating Systems" by Andrew S. Tanenbaum, published by Prentice-Hall, Inc., Copyright 1992. One problem noted relative to this solution is that the new protocol requires considerable changes to be made to a host system. Hence, this approach is not practical where it is essential that the host computer operating system remain intact.

Another approach which has been considered is to provide duplicate communication facilities wherein a separate TCP/IP protocol stack and separate hardware facilities are provided for servicing the network demands of two distinct sets of well-known port application programs. While this solution may be satisfactory in terms of eliminating the naming conflict, it would create considerable processing delays causing application programs executing under control of an emulator to run too slow resulting in decreased overall system performance. Also, this approach is too costly in terms of system resources and is unable to take direct advantage of existing host facilities.

Also, it becomes advantageous to provide support for different interface protocols or hardware interfaces, especially in the case of emulating environments. Here, it has been the practice to provide multiple protocol stacks which enable the use of such different protocols or different hardware interfaces.

Accordingly, it is a primary object of the present invention to provide a method and system which enables application programs running in under control of multiple instances of different operating system components sharing a common communications protocol stack to utilize well-known ports for identifying like protocol application program services.

It is another object of the present invention to provide a method and system for executing application programs which share a common communications protocol stack to utilize well-known port addresses for designating well-known application programs accessible by client application programs on a remote host system which is transparent to the remote system and requires minimal change to the host system thereby facilitating debugging, modifying and maintaining of such application programs.

SUMMARY OF THE INVENTION

The above and other objects of the present invention are achieved in a preferred embodiment of the virtual network mechanism of the present invention which operates under the control of a host operating system, as for example, an enhanced version of the UNIX operating system running on a local host computer system which connects to a local area network (LAN) or internetwork for communicating with a number of remote host systems using a standard communications protocol. In the preferred embodiment, the host system also includes the components of a plurality of hosted operating system components, such as for example, multiple instances of an emulator.

The host operating system further includes a communications network protocol stack which in the preferred embodiment corresponds to a host TCP/IP protocol stack. Both each hosted and host application programs share the single protocol stack. The virtual network mechanism of the present invention resolves the naming conflict arising from the use of multiple instances of well-known port application programs being run by each hosted and host operating systems.

In the preferred embodiment, each remote host computer system which communicates with the host system of the present invention via the internetwork is configured either statically or dynamically to have the local host system function as a "gateway" (a host system that connects two or more different networks) wherein the host system causes packets to be routed from the internetwork (heterogeneous networks connected together) to "another network" according to the network identifier information contained in the network address.

The mechanism of the present invention is configured within the host operating system as a separate network interface which couples to the network protocol stack just as "another physical network." This allows the mechanism to make use of the standard internetwork gateway functionality associated with such communication networks. The IP layer routes each packet addressed to the specific hosted system to the virtual network mechanism as if it were another network (i.e., as if the packets were being transferred from one network to another network through an internetwork gateway).

More specifically, the virtual network mechanism utilizes a different set of control data structures corresponding to a different one of the virtual host systems. Each set of structures includes an interface network structure used for connecting the virtual network mechanism to the network protocol stack, a control structure which represents the particular virtual host system and a client table structure which is used to process client requests directed to the virtual host system by a remotely located client system. By configuring these different sets of structures to operate as a corresponding number of virtual host systems, this enables the routines of the virtual network mechanism used in processing client requests to be shared by the multiple virtual host systems.

The virtual network mechanism contains a mapping component which maps the different IP address portions in a predetermined manner. The mechanism then reintroduces the packet containing the mapped IP address onto the interface of the IP module just as if it had been received from the other network. In greater detail, the IP destination address is mapped to now identify the host system in lieu of a specific hosted system and to replace the "well-known" port number with non-well-known port identifier of the services application program/server (e.g. FTP application server). Additionally, the mapping unit substitutes a virtual host address for the IP source address of the requesting client application program on the remote host system so that any reply packets provided by the application services server in response to the request are automatically directed back to the virtual network mechanism.

For each reply packet received, the mechanism substitutes/restores the appropriate IP source and destination address portions in the IP address and reintroduces the packet onto the network interface as if it had been received from the other network. The IP stack layer now directs the reply packets back to the requesting client application program on the remote host computer in a transparent manner. This ensures that the sharing of the host system communication protocol stack remains completely undetectable to client programs running on the remote system.

The present invention processes client requests for a plurality of virtual host systems while eliminating the need to communicate through additional protocol stacks or to provide additional communication hardware facilities. This in turn enhances overall system performance as well as eliminating the need for having to allocate additional system resources (e.g. memory).

While the preferred embodiment of the present invention is described in terms of an emulator environment, its teachings can be generally applied to systems which share a single protocol stack on the same host system. For example, it may be desirable to have multiple processing units run different copies of the same operating system and share the same protocol stack. Also, it may be equally desirable to have different operating systems running on the same host system share the same protocol stack.

Also, it will be noted that the teachings of the present invention are not limited to requiring that the other system or party to the communications, typically an executing client program, be located in a physically separate computer system. The communications could take place between the host system and one of plurality of hosted systems or between two hosted systems.

The above objects and advantages of the present invention will be better understood from the following description when taken in conjunction with the accompanying drawings.

BRIEF DESCRIPTION OF THE DRAWINGS

FIGS. 1a and 1b illustrate in block diagram form, a host system which incorporates the method and apparatus of the present invention.

FIGS. 6, 7a through 7g and 8 are flow diagrams and associated data structures used in describing the operation of the present invention.

DESCRIPTION OF THE PREFERRED EMBODIMENT

Figure 1B:
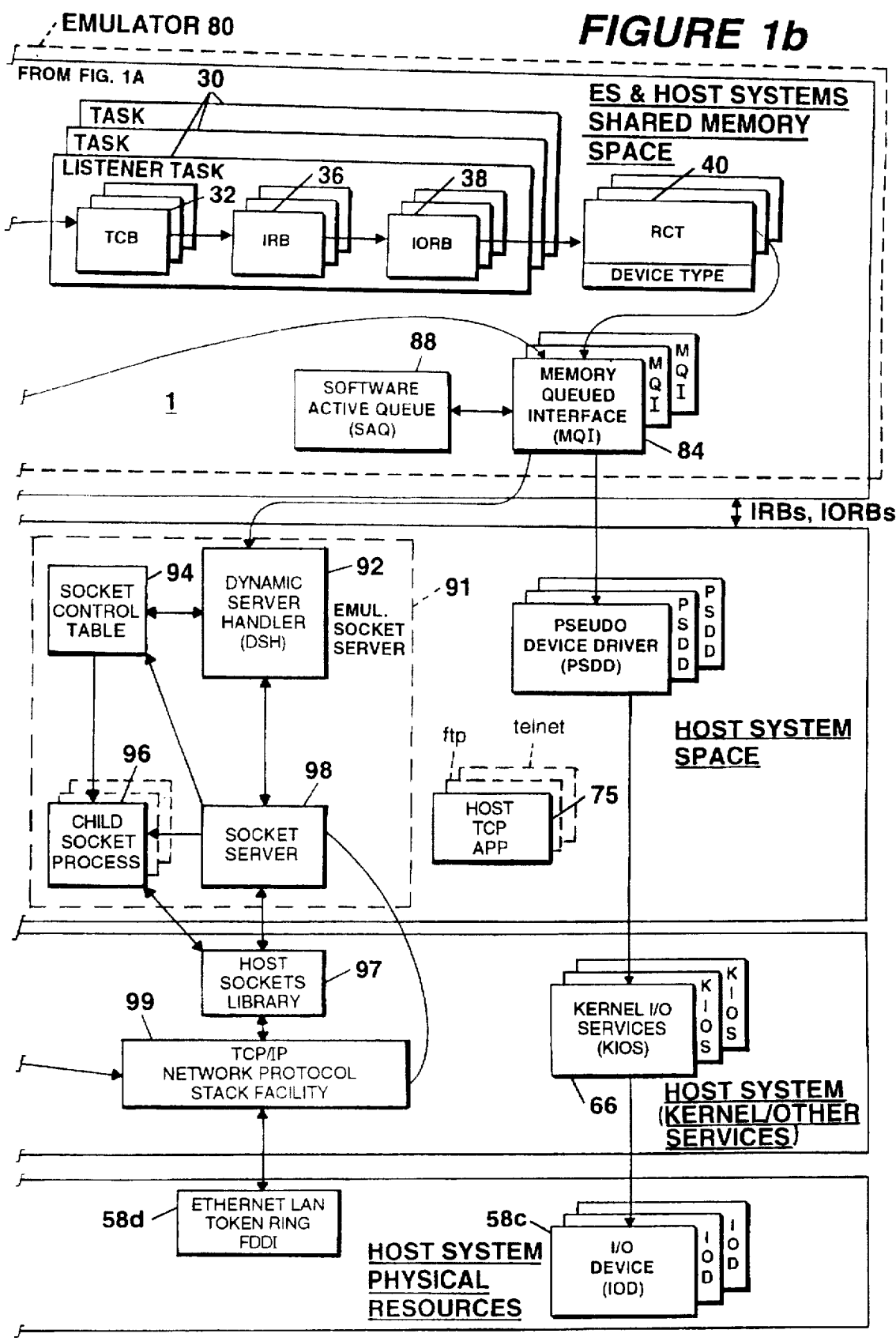

FIGS. 1a and 1b collectively constitute a block diagram of a host system 54 which incorporates the virtual network mechanism of the present invention. As shown, the system 54 includes a hardware platform 56 which contains the hardware elements such as a central processing unit 58a, a main memory 58b and a number of input/output peripheral devices 58c and a communications facility such as an Ethernet local area network (LAN) 58d for connecting system 54 to other processing systems via standard communication network facilities.

The central processing unit (CPU) represented by block 58a is a reduced instruction set (RISC) based processing unit which takes the form of the RS6000 microprocessor manufactured by IBM Corporation. As seen from FIG. 1, hardware platform including processing unit 58a operates under the control of an enhanced version of the UNIX* operating system such as the AIX** operating system. Portions of physical memory represented by MEM block 58b are illustrated in terms of the layered construction. As shown, memory is divided into two basic levels, a user level and an operating system level. The user level is divided into emulated system (ES) and host shared memory space and host or an operating system kernel native memory space. The shared memory space contains the ES executive level 16 which includes a plurality of executive program tasks 30 spawned by ES executive services components of block 28 for executing ES TCP services application programs/servers 22 and system administrator programs 24.

In the preferred embodiment, the well known port application programs, such as for example, TCP application programs provide FTP and Telenet services to client programs. As well-known in the art, telenet service application program allows an interactive user on a client system to start a login session on a remote system wherein the client process passes the user's keystrokes to the server process on the remote system. The FTP services application program permits the transfer of files from one system to another and provides a rich set of features and options, such as user authentication, data conversion, directory listings, etc. In operation, the interactive user invokes an FTP client process on the local system. The client process establishes a connection with an FTP server process on the remote system using TCP. The FTP program establishes two connections between the client and server processes, one for control information and the other for the data being transferred. The interactive user is prompted for access information on the remote system and the files then can be transferred in both directions.

In the emulated system, each task 30 utilizes a plurality of data control structures, such as a task control block (TCB) structure 32, an indirect request block (IRB) structure 36, an input/output request block (IORB) structure 38 and a resource control table (RCT) structure 40. The task control block (TCB) structure 32 contains information pertaining to the state of execution of the associated task as well as pointers to interrupt save areas for storing hardware parameters related to the task. The indirect request block (IRB) structure 36 contains information defining the operation requested by an associated task and includes pointers identifying the task and its associated task control block (TCB) and a pointer to the associated IORB structure.

*UNIX is a registered trademark in the United States and other countries, licensed exclusively through X/Open Company Limited.

**AIX is a registered trademark of International Business Machines Corporation.

The input/output request block (IORB) structure 38 is used as the standard means of requesting a physical I/O service. It contains information such as a logical resource number CLRN) that identifies the I/O device being addressed as well as the location and size of the buffer to be used for the transfer and the specific function (operation) requested. The resource control table (RCT) structure 40 contains information describing the resources, such as its characteristics or information regarding the tasks or requests being executed by a corresponding resource as well as pointers to its associated task control block (TCB) structure.

Additionally, two other structures depicted in FIG. 1a are a group control block (GCB) structure and a user control block structure of block (UCB) 29. The GCB structure contains information required to define and control the operations of a specific task group which defines a named set of one or more tasks with a common set of resources within which a user and system function must operate. Each group has a two character name (e.g., $L, $S) by which the group is uniquely known to the system. The GCB structure includes information identifying the lead task whose execution spawns all other tasks required for executing group programs. As indicated, the GCB structure includes a number of user control blocks CUCB), each of which contains information defining the user's personality such as user node identification, user group id within a node, user task id within group, user person id and pointer information to directories to which the user has access.

As shown, the emulated system utilizes a further data structure corresponding to system control block (SCB) structure 27. This data structure is created at system startup and contains information defining system resources and pointers to the different task groups established by the system represented by a corresponding number of group control blocks in the system. For further information regarding such structures and their relationships to each other, reference may be made to U.S. Pat. No. 5,111,384 and the publication entitled, "HVS PLUS Systems Concepts" published by Bull HN Information Systems Inc., Order No. HE03-01.

As indicated in FIG. 1b, the shared memory space further includes a memory queued interface (MQI) represented by block 84 which provides a form of interprocess communication mechanism and a software active queue (SAQ) of block 88. SAQ block 88 represents a data structure used to provide the path by which the results of the operations performed by the kernel level components are passed back or returned by the host processes to the requesting emulated system user level tasks 30 being executed. Thus, it can be viewed as functioning as an output stage of MQI 84. This data structure is similar to data structures which are used by the emulated system operating system.

MQI block 84 is a semaphore data structure which takes the form of a single linked list controlled by semaphores through a set of routines which are executed by the various host processes operating within different levels or layers that want to communicate with each other. Its routines are used to manage queues within the pseudo device drivers 74 and the software active queue 88.

Executive Services Components 28

As seen in FIG. 1a, the executive services components 28 of executive layer 16 includes a plurality of components or facilities which are equivalent to those facilities normally included in emulated system. The emulated system is a multiprogrammed multiprocessor system. The facilities illustrated in FIG. 1a include a listener module 280, a file management facility 282, a socket monitor call command handler unit 284, and an ES socket library 286 which are arranged as shown. The listener module 280 is responsible for monitoring the operations of terminals configured for login and for initiating user tasks in response to user commands. As indicated in FIGS. 1a and 1b, listener module 280 runs as a task 30 with its own set of unique data structures.

The listener module 280 is able to consult a profiles file containing user specific registration information such as user id, login id and password requirements tabulated by the system administrator for all registered users. The listener module 280 checks the user profile when monitoring the privileges and/or restrictions given to each user. The file management facility 282 includes the conventional shared data structures and set of routines normally provided to perform functions that access such data structures to control the synchronization of concurrent processes or tasks in addition to performing various system services or functions. That is, the facility responds to system service monitor calls identifying the types of services requested (e.g. creating or deleting files, reading or writing records or blocks in files) which result in the specified system services being executed by the emulated system on behalf of executing user application programs.

A monitor call unit (not shown) receives monitor calls from the interpreter component 72 which are in turn to be executed interpretively using the ES executive service components of block 28. A command handler unit (not shown) contains the routines that respond to user commands entered via a terminal or program. In response to such commands, the command handler unit routines invoke the appropriate tasks for executing such commands.

The ES components involved in handling socket operations include an ES socket command handler unit 284 and ES socket library 286. The ES socket library 286 is constructed to provide the same socket application program interface (API) as provided in the emulated system. This interface is described in detail in the manual entitled, "GCOS 6 HVS TCP/IP SOCKET API FOR C USERS," published by Bull HN Information Systems Inc., Copyright 1993, Order No. RD89-00.

The ES socket command handler unit 284 contains a plurality of routines which operate to convert HVS/ES socket calls into the appropriate low level request input/output (RQIO) monitor calls accompanied by IORBs created by mapping/translating the socket library calls into the corresponding socket function codes. As described in detail herein, the IORBs are forwarded to the main socket server component by the EMCU via the MQI interface. The main socket server component then issues the appropriate host (AIX) socket calls to the host system socket facilities.

Emulator Level Layer 68

As indicated in FIGS. 1a and 1b, the next layer within the user level is the emulator executive level 68. This level includes certain components present in the emulated system which have been transformed into new mechanisms which appear to the remaining unchanged components to operate as the original unchanged components of the emulated system. At the same time, these new mechanisms appear to the components of the kernel level 64 as native components with which the host system is accustomed to operate. As shown, the components include the interpreter 72, an emulator monitor call unit (EMCU) 73, dynamic server handler (DSH), main socket server component 98, a number of child socket processes 96 and a socket control table 94 operatively coupled together as shown.

As indicated in FIG. 1a, the emulator executive level 68 further includes a plurality of pseudo devices drivers (PSDD) 74 for each input/output device or type of input/output device which is required to be emulated by host system 54. For example, the pseudo device drivers 74 will include PSDDs for terminals, disk drivers, tape drivers, displays and for certain communication devices.

For a more detailed discussion of other aspects of the SAQ 88, MQI block 84, PSDD 74 and other emulator components, reference may be made to the related patent application.

The interpreter 72 successively fetches the instructions of an emulated system application program, categorizes each instruction and executes it interpretively through sequences of RISC instructions which allows CPU 58a, MEM 58b and other elements of host system 54 to emulate the operations of corresponding elements of the emulated system. The interpreter 72 includes a monitor call (MCL) table containing information for each possible monitor call which it utilizes to determine whether to trap or send an ES monitor call to the ES executive services components 28 for execution of the instruction or to make an emulator call to EMCU 73 for execution of the instruction through the services of an appropriate C language routine (server). The EMCU 73 is responsible for acquiring from the host system 54, the necessary memory and other resources, for initializing the emulated system data structures and invoking interpreter 72 and the various server processes. Both the interpreter 72 and EMCU 73 run as host processes.

As viewed by the host system, the ES service components 28 and tasks 30 being executed on behalf of the application programs, the interpreter 72 and EMCU 73 are executed in the system 54 of FIGS. 1a and 1b as a single process (emulator) 80 wherein such process corresponds to one or more user processes as defined by the conventions of the host operating system being run on host system 54. Thus, it is possible to have multiple instances of the emulated system concurrently emulated on host system 54.

The dynamic server handler (DSH) 92 is created by EMCU 73 during system initialization. The server 92 communicates with emulated system processes through MQI 84 as indicated in FIG. 1b. The lower level main socket server 98 and socket control table 94 are dynamically created by higher level server 92 for carrying socket operations according to the present invention. The main socket server 98 creates child socket processes as a function of the type of socket operation to be performed and manages such child processes through socket control table 94. All of the servers operate as root and therefore have super user privileges with access to any file within the host system 54. The server 92 includes mechanisms specifically designed for validating security at the user level in conjunction with the execution of dual decor commands and functions.

For the purpose of the present invention, the components 92 through 98 collectively can be viewed as a socket server for emulator 80 which is used to communicate over the host system socket layer. It will also be noted that the level 62 also includes the different host TCP application service programs 75 which provide TCP and Telnet services. These application services programs/servers are represented by block 75 in FIG. 1b and also communicate over the same host system socket layer and share the same TCP/IP network protocol stack facility 99.

Operating System/Kernel Level

The operating system/kernel level 64 includes the standard mechanisms and components normally included within the host operating system. As shown, level 64 includes a kernel process manager component 70 and a number of host kernel I/O services (KIOS) processes 66 for each pseudo device driver (PSDD) 74 which is to be emulated by the host system. Additionally, in the preferred embodiment of host system 54, level 64 is assumed to contain the standard utility programs, shell, editors, compilers, etc. and libraries (e.g., I/O libraries, open, close) which are accessed in the host user mode. For further information regarding the use of such arrangements, reference may be made to publications of the IBM Corporation describing the AIX operating system.

In the preferred embodiment, the kernel/operating system level 64 further includes as an interprocess communications facility, an implementation of "sockets" which includes a host sockets library 97 for storing a plurality of socket subroutines and network library subroutines and a TCP/IP network protocol stack facility 99 arranged as shown. The stack facility 99 connects to network driver software (e.g. Ethernet, Token-Ring, FDDI) included within kernel level 64 (not shown) which communicates with the Ethernet/Token-Ring/FDDI LAN 58d.

As indicated in the system of FIG. 1b, as in the case of the AIX operating system, the socket subroutines contained in host sockets library 97 serve as the application program interface (API) for TCP/IP. This API provides three types of communications services which use different components of TCP/IP. These are reliable stream delivery, connectionless datagram delivery and raw socket delivery. The preferred embodiment uses reliable stream delivery communication services. For further information regarding sockets, reference may be made to various well-known publications and texts such as publications of IBM Corporation describing the AIX Version 3.2 for RISC System/6000 and the text entitled "UNIX System V Release 4: An Introduction for New and Experienced Users," published by Osborn McGrawHill, Copyright 1990 by American Telephone and Telephone and Telegraph Company.

Virtual Network Mechanism

According to the teachings of the present invention, the operating system level 64 also includes a virtual network (VNET) mechanism 100 which operatively couples to the TCP/IP network protocol stack facility 99 in the same manner as the network interface associated with the network driver and LAN 58d couples to facility 99 as explained in detail herein. The VNET mechanism 100 also couples to a plurality of sets of structures represented by block 102 located in host system memory which are used to process client requests received via facility 99 directed to a plurality of virtual host systems/hosted systems.

Figure 2:
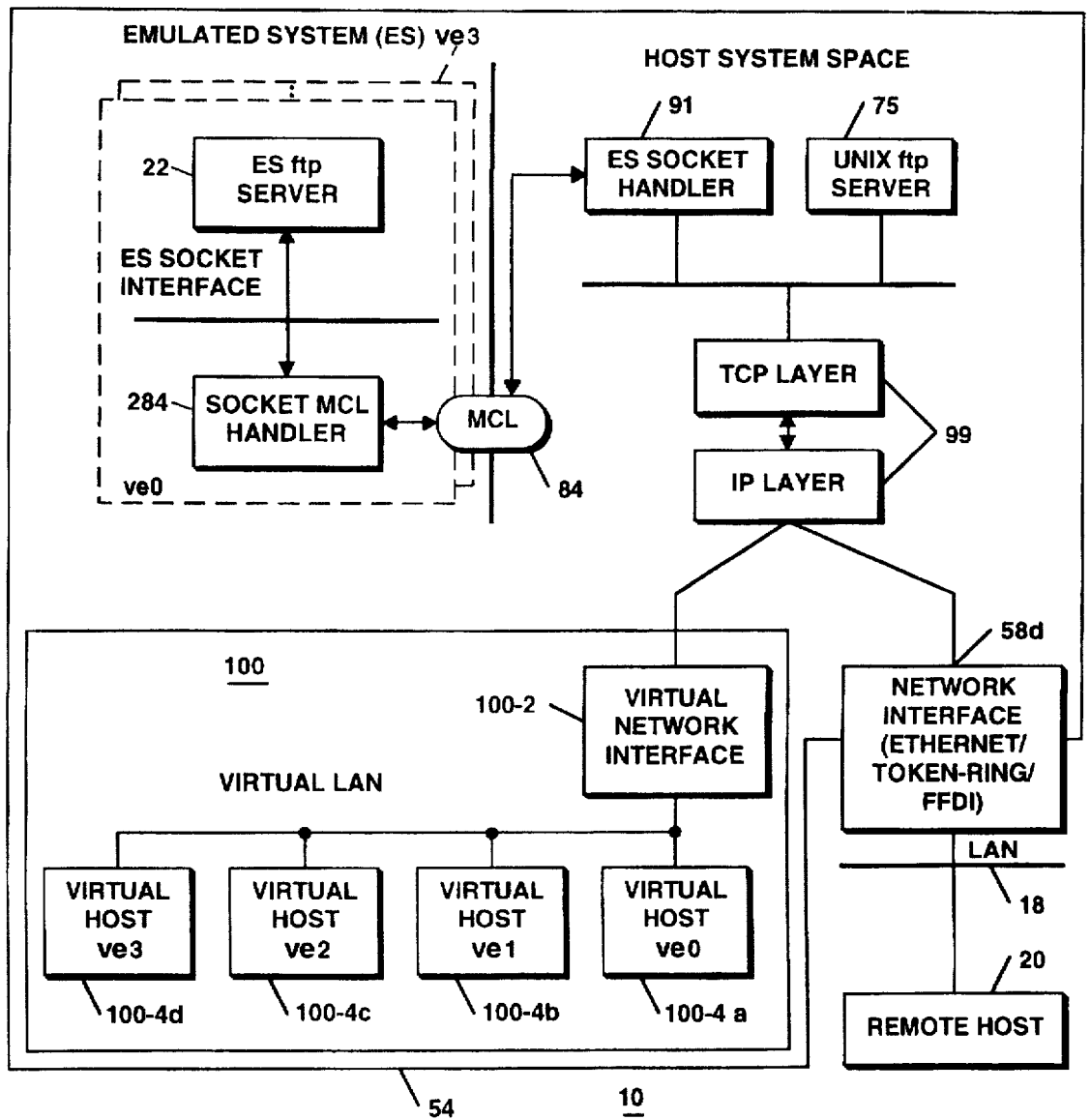
FIG. 2 is a simplified system block diagram illustrating the use of the virtual network of the present invention in an internetwork.

FIG. 2-Simplified Network Block Diagram

FIG. 2 is a simplified block diagram of a portion of a internetwork system 10 which discloses in greater detail, how the VNET mechanism 100 of the present invention is incorporated into the host system of FIG. 1. As seen from the Figure, only the components relevant to describing the teachings of the present invention are depicted in FIG. 2. As indicated, the VNET mechanism 100 functionally represents a plurality of virtual host systems ve0 through ve3 running a corresponding number of emulating hosted operating systems, such as emulator 80. In the preferred embodiment, each virtual host system connects to a local area network which corresponds to the virtual LAN of block 100. As described herein, the network structure of the emulated system in terms of IP address is incorporated into the host system 54 by configuring the virtual network mechanism 100 into the host system as described herein.

As shown, the mechanism 100 includes a virtual network interface portion 100-2. In many respects, this interface is functionally similar to the network interface labeled 58d connected to the physical local area network (LAN) 18. In addition to the LAN, the interface 58d includes the standard software routines (e.g. drivers) which provide a uniform interface to the Internet Protocol (IP) network layer. Thus, the interface performs all of the necessary communications between the IP layer and the physical LAN normally through an appropriate physical device handler. For the purposes of the present invention, the software portion of the network interface 58d may take the form of the AIX Network Interface Driver(s) described in standard IBM publications.

As described later herein, the virtual network interface 100-2 is also constructed to incorporate the same functionality as included in the network interface software of block 58d. In the case of an Ethernet LAN consisting of host machines which use the TCP/IP protocols, such as shown in FIG. 2, there are two types of addresses. One is the 32 bit Internet address and the other is the 48 bit Ethernet address. Typically, Ethernet addresses are assigned by the manufacturer of the interface board and are all unique. To determine the Ethernet address which corresponds the host system having a particular IP address, an Internet Address Resolution Protocol (ARP) is used wherein a host is allowed to broadcast a special packet on the Ethernet that asks the host with a specified IP address to respond with its Ethernet address. The broadcasting host system then can store the response and maintain the mapping between the IP address and the Ethernet address for all future packets designating that IP address.

Relative to gateways, it is the IP layer/module that handles routing through the internetwork. The IP layer provides a connectionless and unreliable delivery system. It is connectionless because it considers each IP packet independent of all others. Any association between packets is provided by the upper TCP layer. Every IP packet contains the source address and destination address as discussed herein so that each packet can be delivered and routed independently. The IP layer is unreliable because it does not guarantee that IP packets ever et delivered or that they are delivered correctly. The IP layer computes and verifies its checksum. This allows it to verify that the fields that it needs to examine and process. When an IP header is found in error, it is discarded, with the assumption that a higher layer protocol will retransmit the packet. If the IP packets arrive at a host or gateway so fast that they are discarded, the IP module sends an Internet Control Message Protocol (ICMP) source quench message to the original source informing that system that the data is arriving too fast.

The present invention makes use of the routing capabilities of the IP module. A gateway determines the route of a packet by consulting a network routing table. In TCP/IP, routing can be one of two types. The first type is static routing which uses manual input to update the routing table. The second type is dynamic routing which uses routing daemons to update the routing table automatically when new information is received. Therefore, when the host system 20 desires to communicate with the virtual network mechanism 100, it utilizes a route command which allows a user on host system 20 to make manual entries into the network routing tables. In the preferred embodiment, a host system route command is used to statically configure a gateway for the virtual host system 100-4 connected to the virtual LAN of virtual network mechanism 100 to which the user on host system 20 wants to connect. The route command has the following format: route add -net network_address gateway_address. When the operating system is rebooted, the gateways must be configured again. For a static or permanent configuration, gateways can be configured via the operating system configuration management system.

As shown in FIG. 2, the LAN 18 in addition to connecting to host system 54 also connects to another host system 20. When the virtual network mechanism 100 is configured into the system, it is viewed by the host system 54 as another network since it is constructed to have its own separate network interface. Each IP address includes a network ID field and a host IED. As indicated above, host systems which attach to two or more networks are "gateways." That is, a gateway has two or more network interfaces, one for each network with which its communicate regardless of network type.

A gateway receives packets from other hosts and gateways for delivery to the hosts on the local network and also route packets from one network to another. Since each IP address includes a network ID and a host ID, gateways can easily extract the network ID field from the IP address and route IP packets based solely on the network ID. Since packets are routed according to the destination network and not according to destination host, a gateway need only to know the location of other networks, and does not need to know the location of every host system on an internetwork. Thus, the destination network takes care of sending the packet to the destination host.

Therefore, when host system 20 adds the virtual network IP address to its network routing table, the same routing information is also passed to host system 54 through static or dynamic routing and entered into the network routing tables utilized by the IP module of the host system 54 on which the virtual network mechanism 100 resides. Accordingly, as described later herein, the IP module automatically routes those IP packets/designating the virtual LAN to virtual network mechanism 100.

Figure 3:
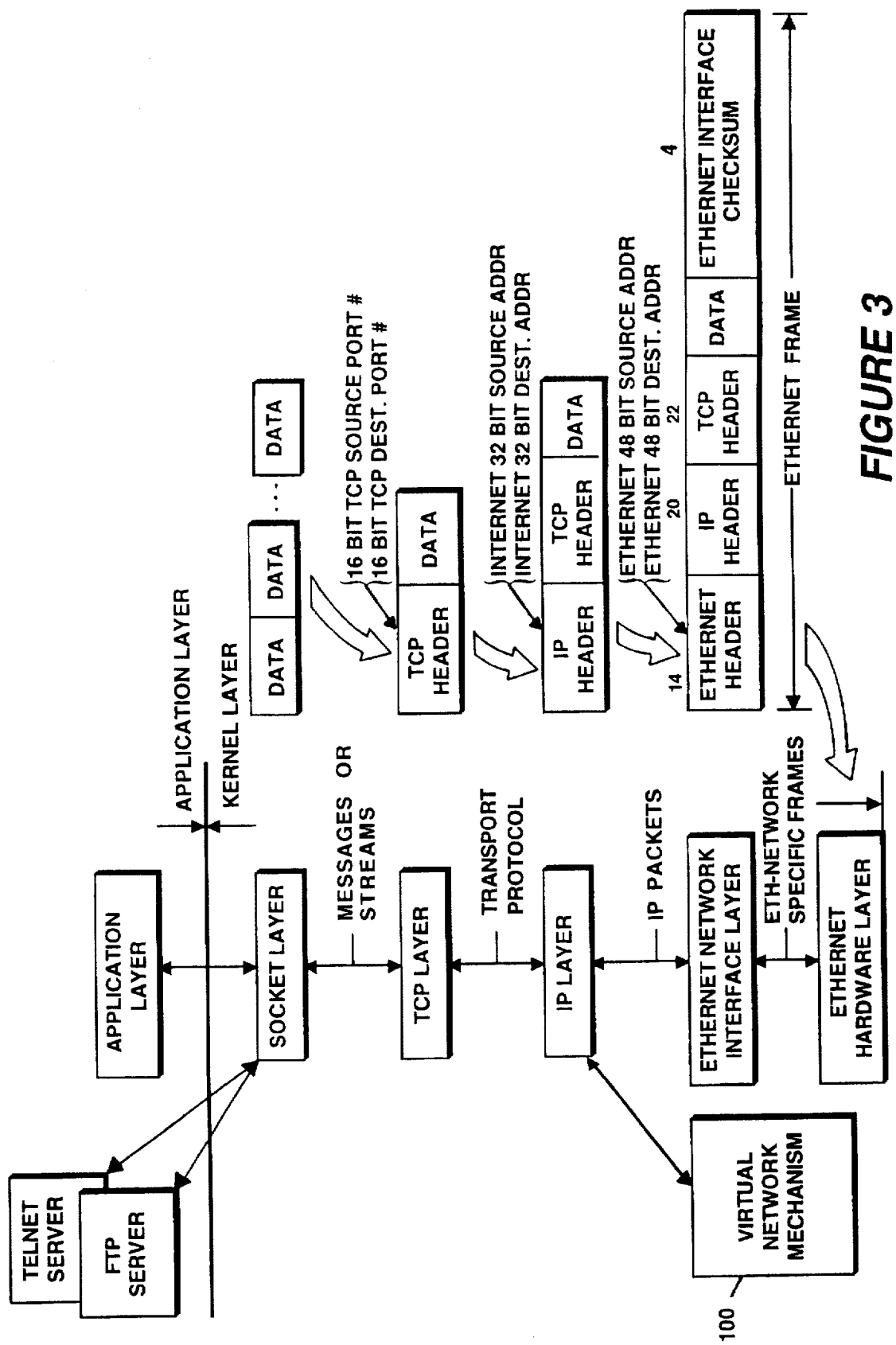
FIG. 3 is a diagram illustrating the positioning of the virtual network mechanism within a layered communication network, according to the teachings of the present invention.

FIG. 3-Virtual Network Mechanism Location

FIG. 3 illustrates in diagrammatic form, the positioning of the virtual network mechanism 100 according to the present invention, relative to the TCP/IP conceptual layered organization. As indicated in FIG. 3, the VNET mechanism 100 directly couples to the IP layer so that it looks like another network interface to the host operating system TCP/IP protocol stack. The application layer is the level at which the TCP/IP application programs or user processes operate/reside. The several application programs provided by almost every TCP/IP implementation include FTP and Telnet which were discussed above.

The socket layer is the first kernel layer and it provides an application program interface (API) to the TCP/IP communications protocol. Each TCP/IP application program (process) is defined by the IP address of the host system on which it runs and the port number through which it communicates with TCP/IP. Sockets are used to establish communications. A socket is the pair of numbers which uniquely identifies each application. More specifically, a socket is defined by an IP address and port number. As discussed above, the Telnet and FTP application programs use the same port number in all TCP/IP implementations. Those "assigned" port numbers are called "well-known ports" and the standard application programs are called "well-known services." Thus, the socket layer is said to support the concept of reserved ports in the Internet domain wherein standard Internet application programs are assigned well-known ports.

The TCP or transport layer provides a connection oriented reliable full duplex byte stream service to an application program. The TCP module contains the necessary logic to provide a reliable virtual circuit for a user process. It handles the establishment and termination of connections between processes, the sequencing of data that might be received out of order, the end to end reliability (checksums, positive acknowledgments, timeouts) and the end to end flow control. TCP uses 16 bit integer port numbers for identifying the data associated with each user process.

As discussed above, the IP layer provides the packet delivery service for the TCP layer and computes and verifies its checksum. The IP layer uses 32-bit integer IP addresses for identifying the networks and host computers on the internet.

The network interface layer passes frames between physically connected hosts and is responsible for link/media access control. The hardware or physical layer provides the physical connectivity. In the preferred embodiment, as discussed above, the network and hardware layers are implemented to conform to one of the physical networks, such as for example, Ethernet LAN requirements and are hence labeled with the prefix "Ethernet." As indicated, these layers could be made to conform to Token-Ring or FDDI as well as other types of physical networks.

Also, FIG. 3 illustrates the type of data flow taking place between the different layers. More specifically, the figure shows the addition of control (header) information, termed encapsulation, by the different layer modules when data being sent by a TCP application program to another host system.

Figure 4:
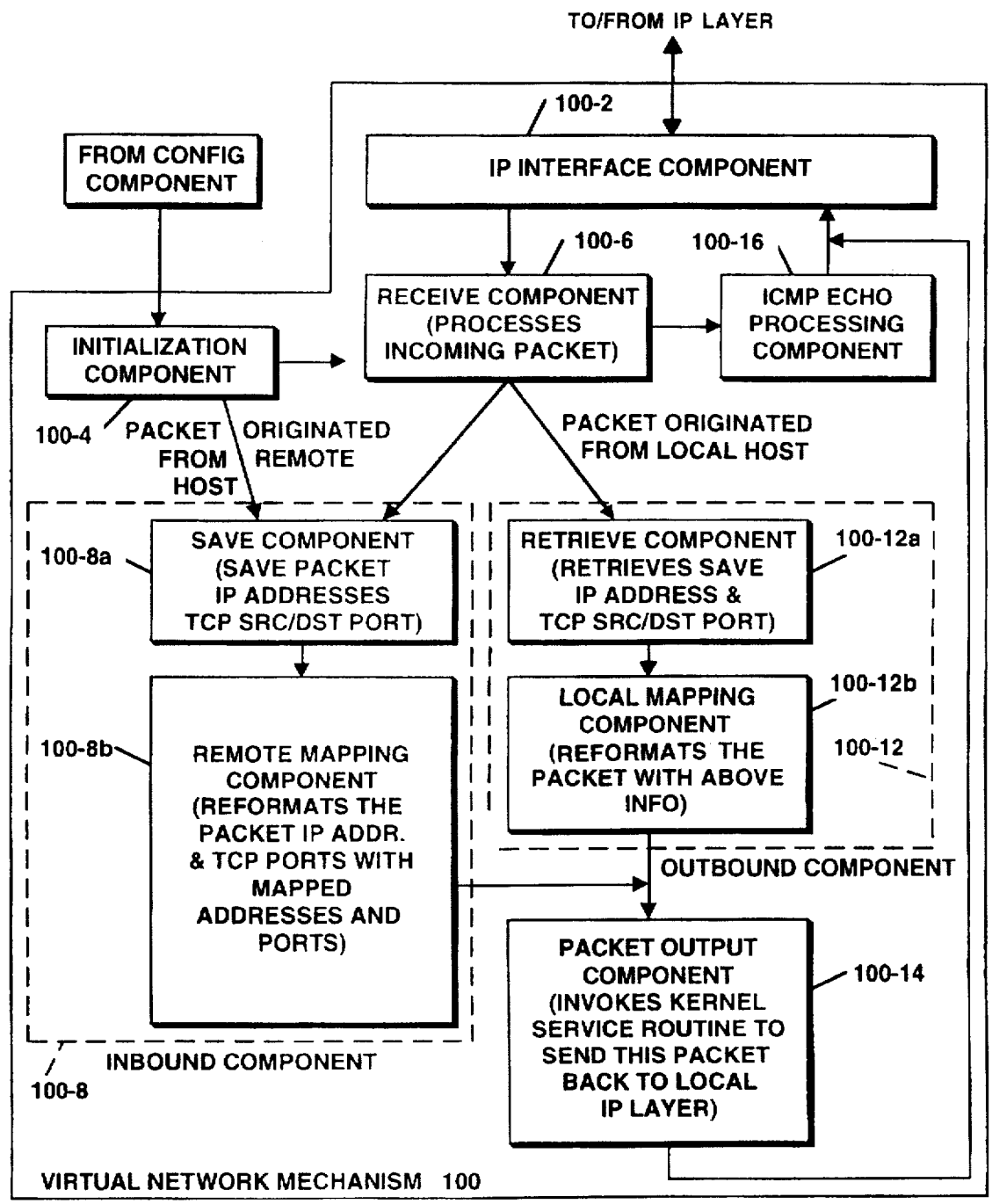
FIG. 4 is a block diagram of the virtual network mechanism of the present invention.

FIG. 4-Well-Known Port Virtual Network Mechanism Block Diagram

FIG. 4 illustrates the various parts of the Virtual Network Mechanism 100. As shown, the mechanism 100 includes the components 100-2 through 100-14 which operatively connect as shown. The IP interface component block 100-2 represents the various interface routines utilized by the different sets of structures corresponding to the virtual host systems ve0 through ve3. In the preferred embodiment, the interface table structure 100-2 defines one of the three types of physical interfaces. For the purpose of the present invention, the interface 100-2 conforms to the type of network interface utilized within the AIX operating system. Generally, this type of interface accepts output packet of a specified maximum length, and provides input packets received from its medium to higher level routines.

Control Data Structures

As explained herein, each virtual host system is represented by a set of control data structures which include an ifnet structure, an ve_softc structure, and client table structure. The ifnet structure for the network interface defines a queue or network interface table for such interface which is used by the IP module routing software code to locate the interface. It contains control information defining the type of interface, its properties, routines and status statistics as described herein below.

The ifnet structure has the format indicated in FIG. 7c. The functions of the ifnet structure include loading and initializing, communicating with the IP network layer, communicating with device handler software, translating an IP address to a hardware address for the underlying device driver software, handling ifnet specific ioctl calls and terminating and unloading. The present invention makes use of this same type of network structure mechanism utilized by the host operating system for a physical network interface unit which eliminates the need to introduce any additional network structures or software to be associated with the virtual network mechanism 100.

As indicated in FIG. 7c, the ifnet structure contains a number of different fields, only some of which are utilized by the virtual network mechanism 100. A first field is a name field (if_name) which identifies the virtual host (i.e., ve0, ve1, ve2 or ve3). A second field is a unit field (if_unit) which is an integer used to locate the virtual host system control structure associated with the virtual host system (i.e. ve_softc). The ifnet interface structure also includes interface property fields such as the flags field (if_flags) which is used to indicate the state of the interface/virtual host system (e.g. an IZFF_UP state indicating that the interface/virtual host is up, an IFF_RUNNING state indicating that the interface/virtual host is running which allocates resources), an ifaddr structure which contains information about one interface address which is a pointer to a linked list of addresses used by the IP module to locate all of the network interfaces of a given address family on the host system (e.g. Ethernet interface 58d), interface routines fields which identify the different routines used by an attached interface (e.g. if_init, if_output, if_ioctl) and interface statistics fields.

Figure 5:
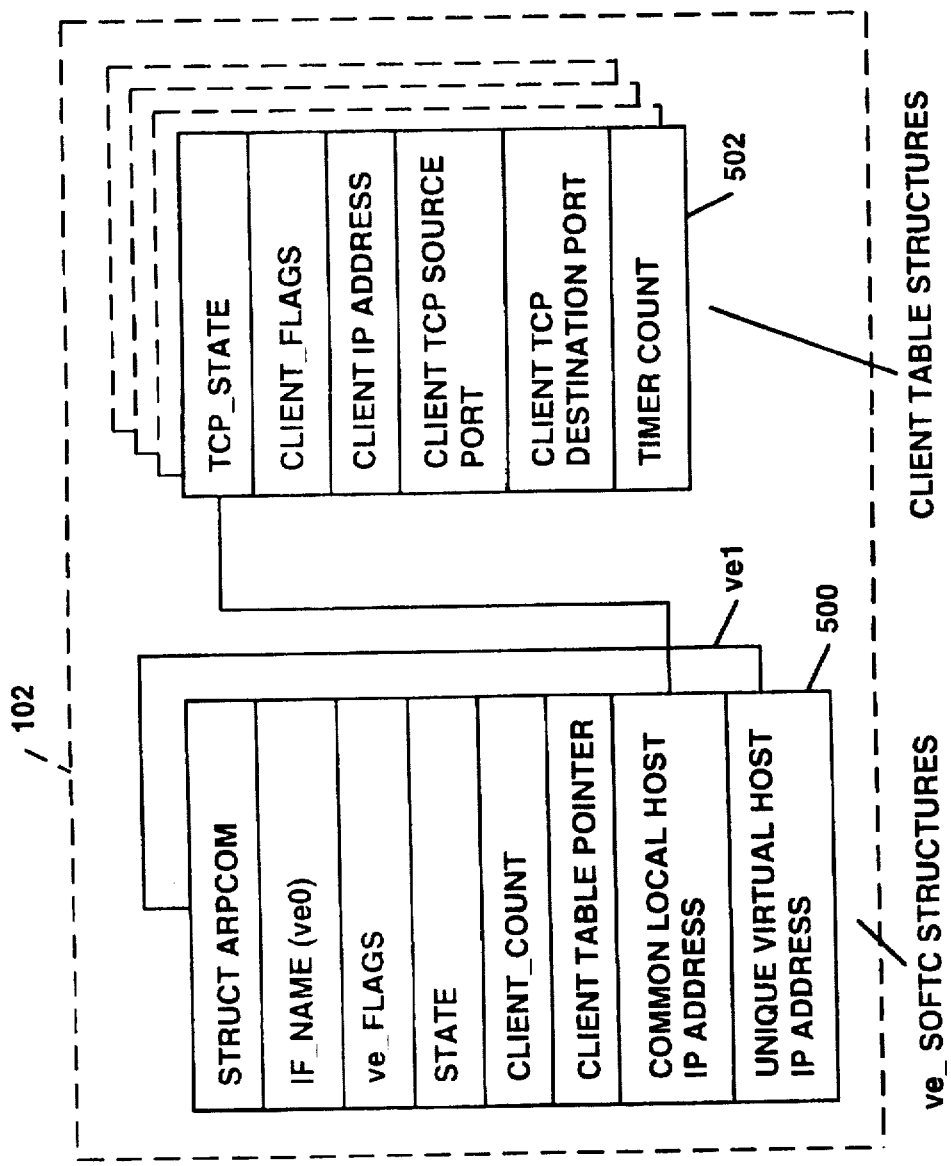
FIG. 5 illustrates in greater detail, the different structures utilized by the virtual network mechanism of the present invention.

FIG. 5 illustrates the set of control structures used by each of the virtual host systems ve0-ve3. Each control data structure designated ve_softc defines a different one of the virtual host systems (i.e. ve0 through re3 of FIG. 2). As indicated in FIG. 5, each ve_softc control structure also designates the client table structures used by its associated virtual host system to process requests received from remotely located client processes.

As seen from FIG. 5, each ve_softc structure includes a number of different fields and structure designated struct arpcom through virtual IP address. The structure arpcom defines a network common structure which is shared by the mechanism 100 and the so-called address resolution code which can be viewed as standard. The if_name field is used to define the virtual host system name (e.g. ve0) while the ve_flags field is used for storing a private flag. The state field defines the state of the virtual host system while the client_count field defines the number of different client processes in the table. The client table pointer field defines the address of the first client table as indicated in FIG. 5. The local IP address field is used for storing a commonly used local host IP address value while the virtual host IP address field is used for storing a unique virtual host IP address value. By using a common local host IP address, this eliminates the need to replicate the software routines of the virtual network interface 100-2 of FIG. 2.

As indicated in FIG. 5, the client table data structure includes the fields tcp_state through timer count as indicated in FIG. 5. The tcp_state field defines the virtual operational state of the client table relative to processing a given client request by the TCP module. The client_flags field is used for storing information pertaining to the state of the table entry (e.g. available=CLIENT_EMPTY=00, in use=CLIENT_INUSE=0, closing=CLIENT_ENDING=02). The client IP address field is used for storing the client IP address while the client tcp dst port field is used for storing the client TCP source port number. The client tcp dst port field is used for storing the client TCP destination port number. Lastly, the timer count field is used for storing a timer count value indicating the number of minutes which have elapsed since there was a client request from the particular remote client process. This used to remove entries assigned to client processes which have been rendered inactive.

Continuing on with the description of FIG. 4, it is seen that incoming packets are applied to an input receive component 100-6 which determines the type (i.e., ICMP or TCP protocol type message) and the source of packet message being received and forwards it to the appropriate component for processing. More specifically, if the packet is an ICMP message packet such as an echo message used by the Internet Control Message Protocol, it is forwarded to ICMP echo processing component 100-16. If the packet is an Ethernet, Token Ring or FDDI type message packet, it is forwarded to either inbound component 100-8 or outbound component 100-12 as a function of which source originated the packet. The ICMP component is included in order to respond to ping inquiries.

The component 100-8 processes inbound tcp packets originated from a remote host system while outbound component 100-12 processes outbound tcp packets originated from the virtual local host system. As indicated, the inbound component 100-8 contains the routines of block 100-8a which save the packet IP address, TCP source and destination port numbers. It also includes the routines of block 100-8b which create a set of mapped TCP source and destination ports according to the present invention which are used to reformat the IP address and TCP ports resulting in forwarding the packet to the appropriate emulated system TCP application program (e.g. ftp, telenet, etc.). The outbound component 100-12 contains the routines of block 100-12a which retrieve the appropriate previously stored original remote host IP address and TCP source and destination port values. These values are used by the routines of block 100-12b to reformat the packet for rerouting the packet back to the remote host system 20.

As indicated in FIG. 4, both inbound component 100-8 and outbound component 100-12 forward each packet to output component 100-14. Component 100-14 includes routine (FIND_INPUT_TYPE) which invokes a kernel service routine for sending each such packet back to the local host network interface.

The initialization component 100-4 includes a number of routines for performing the operations required for initializing the virtual network mechanism 100 and the sets of virtual host control structures inet, ve_softc and client table control structures associated with each of the virtual host systems ve0-ve3.

DESCRIPTION OF OPERATION

With reference to FIGS. 1 through 8, the operation of the preferred embodiment of the virtual network mechanism 100 of the present invention will now be described. By way of example, it is assumed that a number of client user processes running on the remote host system 20 of FIG. 2 want to utilize the emulated system FTP services application program 22 running on host system 54. In accordance with the teachings of the present invention, host system 54 is configured to attach to the IP layer, a plurality of network interfaces, one for each emulating hosted operating system/virtual host which are utilized by virtual network mechanism 100 to communicate with the IP layer. When so configured, the virtual network mechanism 100 operates with the different sets of structures, each of which has the local host IP address and its own virtual host IP address.

By way of example, it will be assumed that the IP address of the local host system has the value 215.65.43.1 wherein the value "215.65.43" designates the network address of the virtual LAN and the value "1" designates the address of the local host system connected to the virtual LAN. It will be appreciated that the values selected could have any numerical value as long as they are selected according to the standard internetwork conventions. That is, just as in any network, each connection point or node must be assigned an IP address. Accordingly, each emulated system/ virtual host 100-4a through 100-4d running the TCP application program which shown as connecting to the virtual LAN must also be assigned its own IP address.

By way of example, it is assumed that the virtual host 100-4a has an IP address value of "215.65.43.2" wherein the value "215.65.43" again designates the network address of the virtual LAN and the value "2" designates the virtual host address of the emulated system/virtual host 100-4 which connects to the virtual LAN. Each of the other virtual host systems ve1 through ve3 has IP address values which corresponds to the incremented IP address of its local host system (e.g. ve1, ve2, ve3) as for example, address values "215.65.43.3" through "215.65.43.5." Again, the value "215.65.43" designates the network address of the virtual LAN and the values "3" through "5" designate the virtual host IP addresses of the virtual host systems 100-4b through 100-4d connected to the virtual LAN. It will be understood that the IP virtual addresses and the network LAN could have other values.

It will be appreciated that host system 54 which connects to "real" LAN 18 also has its own IP address which is assumed to correspond to the value "192.45.6.7" while it is assumed that the remote host system 20 has an IP address of 192.45.6.8. The value "192.45.6" corresponds to the network address while the host address values "7" and "8" designate host system 54 and remote host system 20, respectively.

It can be seen that when so configured, system 54 can be viewed as actually being connected to two separate and distinct LANs. Therefore, when remote host system 20 wants to communicate with any application programs (e.g. FTP, TELNET) of emulated system/virtual hosts 100-4a through 100-4d which actually correspond to separate copies of ES components running under the control of the operating system of host system 54, system 20 just has to configure the local host system 54 to function as a "gateway" in the same way it would configure a host system connected to a "real" LAN.

In the system of the preferred embodiment, configuring is done by means of a "route add" command. More specifically, a user configures the remote host system having IP address 192.45.6.7 as a gateway or route for emulated system/virtual host having IP address 215.65.43.2. In greater detail, the route add command used to connect the virtual host having IP address 215.65.43.2 would have the following form: route add -net 215.65.43 123.45.6.7. Here, the value "215.65.43" specifies a particular network address argument (network_address) while the value "123.45.6.7" specifies a particular gateway address parameter (gateway_address). Once the route add command is executed, it configures the static route for connecting to emulated system application programs. As previously discussed, gateways can be statically or dynamically configured in a manner with is well-known in the art.

Additionally, the host system 54 must also configure the local host IP address for virtual network mechanism 100-2 to communicate with the virtual host systems ve0–ve3. According to the present invention, this may be done by means of separate "VIRNET" directives included in the hosted system (emulator) configuration file clm_x file. Each VIRNET directive has the following format: VIRNET ve(n) [ctl_args] wherein the first argument "ve(n)" specifies the particular virtual network interface mechanism 100 according to "n" which has the values "0" through "3."

The remaining arguments include an address, up and down arguments. The "address" argument corresponds to either a host name or an IP address in the standard dotted decimal notation. The address used for this argument is assigned to the host side of the virtual network interface mechanism 100 (i.e., local host interface 100-2). This address is automatically incremented by one to create the IP address for the first virtual host system ve0 connected to the virtual LAN on the opposite side of virtual network mechanism 100-2. The "up" argument is used to activate the virtual network interface mechanism 100-2 while the "down" argument is used to deactivate the virtual network interface mechanism 100-2.

When a VIRNET directive is used in this example to configure the first virtual host 100-4a which connects the virtual network mechanism, the directive has the following form: VIRNET ve0 215.65.43.1 up wherein the value "215.65.43.1" corresponds to the local host IP address and "215.65.43.2" corresponds to the virtual host IP and "up" specifies the activation of the mechanism 100. The VIRNET directive is entered into the hosted operating system (emulator) clm_x file and is used for loading and configuring the virtual network mechanism 100 software into the operating system kernel of host system 54. Other VIRNET directives having similar forms can be used to configure other ones of the virtual hosts ve1 through ve3. In the convention used by the present invention, it is not necessary to again setup the local host IP address since it was previously configured when the first virtual host ve0 was configured. As indicated, each virtual host system uses the same local host IP address which allows the use of the same software routines included as part of virtual network interface 100-2.

If a virtual host system is not configured via directive, it can be started from an operating system command line using a special command which serves the same function as the VIRNET directive. This command has the format: hvx_vecfg re(n) [ctl_args] wherein "n" is used to designate the specific virtual host system (e.g. ve0, ve1, etc.). The arguments ctl_args are the same as those of the VINET directive. The command can be used at any time to activate the virtual network mechanism 100-4a or change its parameters. In the present example, the command used to configure mechanism 100 has the following form: hvx_vecfg ve0 215.65.43.1 up. The command configures and starts virtual network mechanism 100 with an IP address of 215.65.43.1. As previously mentioned, this address is automatically incremented to establish the virtual host IP address of 215.43.2 for the first virtual host system ve0 running the emulating hosted operating system. The other virtual host systems are similarly configured but without performing any further increment operation.

Initialization

The above described configuration operations can be assumed to take place as part of the loading and start up of each emulator 80 of FIGS. 1a and 1b which is to be run. Such operations are represented by block 600 in the flow diagram of FIG. 6. The load operation involves performing the required configuration tasks, such as configuring the different TCP/IP application programs (i.e., servers) and configuring the IP address for the associated virtual host system using the VIRNET directive included in the clm__x file. Additionally, the route command is used on the remote host to configure a gateway for the host system 54 to which the remote host system is to be connected. This completes the operations of block 600.

Figure 6:
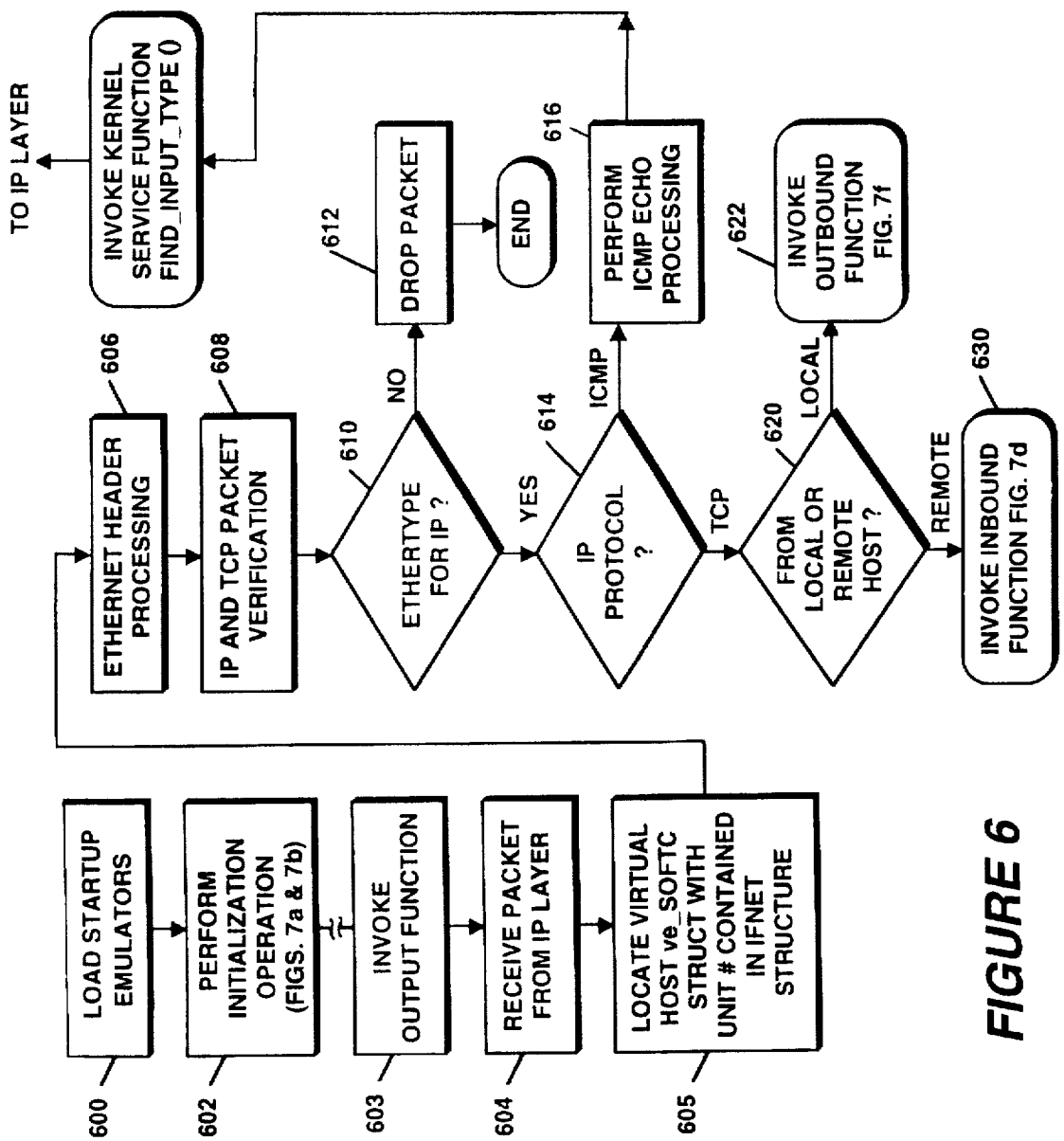
Figure 7A:
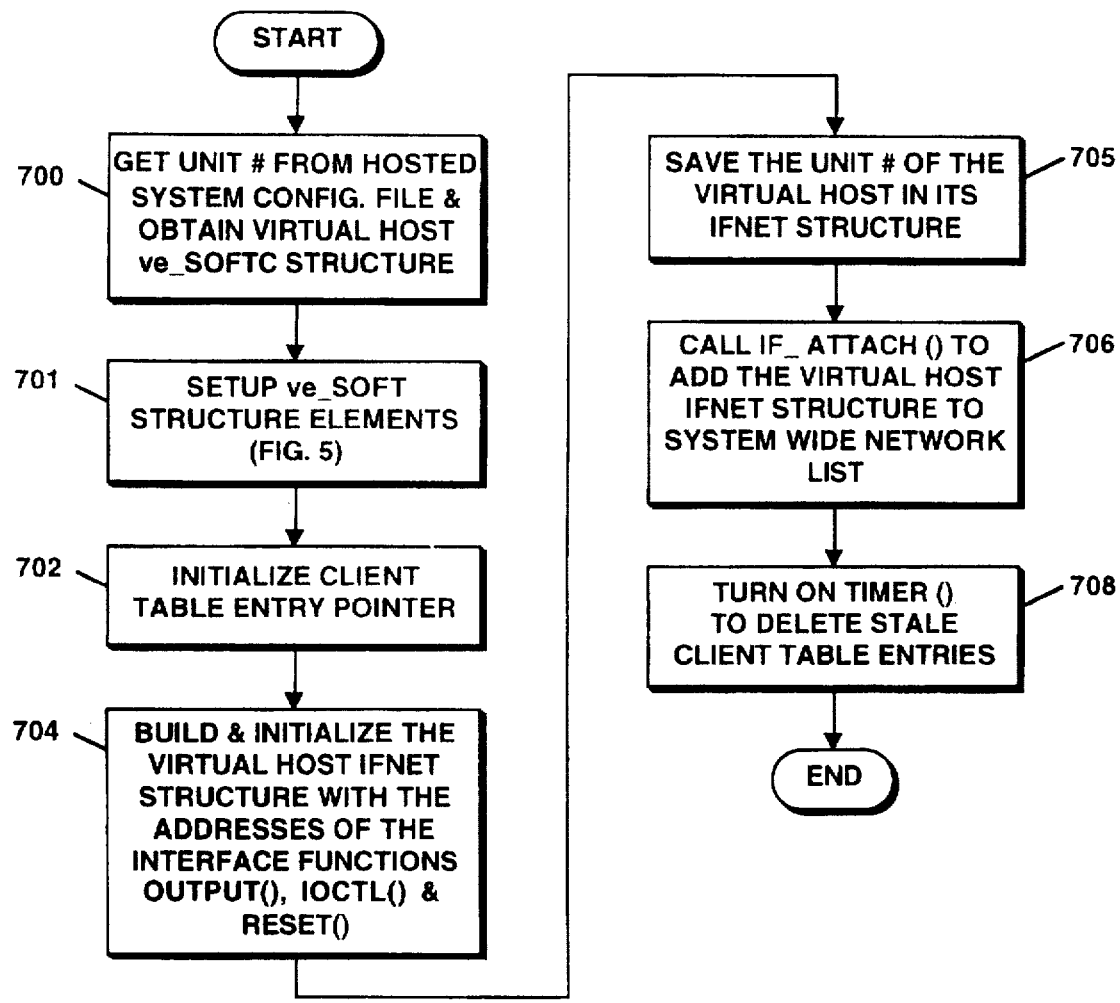

Next, as shown in FIG. 6, the host system performs the initialization operations of block 602. These operations are shown in greater detail in FIG. 7a. Referring to FIG. 7a, it is seen that host system 54 first obtains the unit number value from the configuration file which the host system 54 uses to locate the ve__softc control structure which defines the first virtual host system 100-4a. Next, system 54 sets up the various elements of the ve___soft control structure 500 shown in FIG. 5 as indicated in block 700. That is, the appropriate parameter values are loaded into the eight fields illustrated in FIG. 5. More specifically the fields are initialized as follows: the arpcom struct name to the "Ethernet common part", the ve__flags, the state of the interface to zero, the client__count value is set to zero (maximum value=512 which is an arbitrary value), the client table pointer value which specifies the location of the first client table structure is set to zero, and the local IP and virtual IP addresses are set to zero. Next, the host system initializes the client table entry of FIG. 5 as indicated in block 702. More specifically, the fields tcp__state through timer count are initialized to zeros.

Next, as indicated in block 704, the host system 54 builds the ifnet structure of FIG. 7c for the virtual host system 100-4a. It initializes its fields so that it contains with the addresses of the interface functions/routines (i.e., if__output, if__ioctl and if__reset) utilized by the virtual network mechanism 100. Additionally, the appropriate value designating the type of interface which is "Ethernet" in the present example, is also loaded into the structure. As indicated in block 705, system 54 saves the unit number value identifying the virtual host system ve0 in the if__unit portion of the associated ifnet structure.

Next, as indicated in block 706, the host system calls the if__attach kernel services of the AIX network interface device software layer which adds the virtual network mechanism 100 as another network interface to the system wide network interface list. That is, the configured ifnet and ve__softc structures are properly registered. Also, as indicated in block 708, the host system turns on the timer function which provides an arbitrary value (e.g. 20 minute) time interval to clean out stale client table entries. This completes this portion of the initialization sequence of block 602.

Figure 7B:
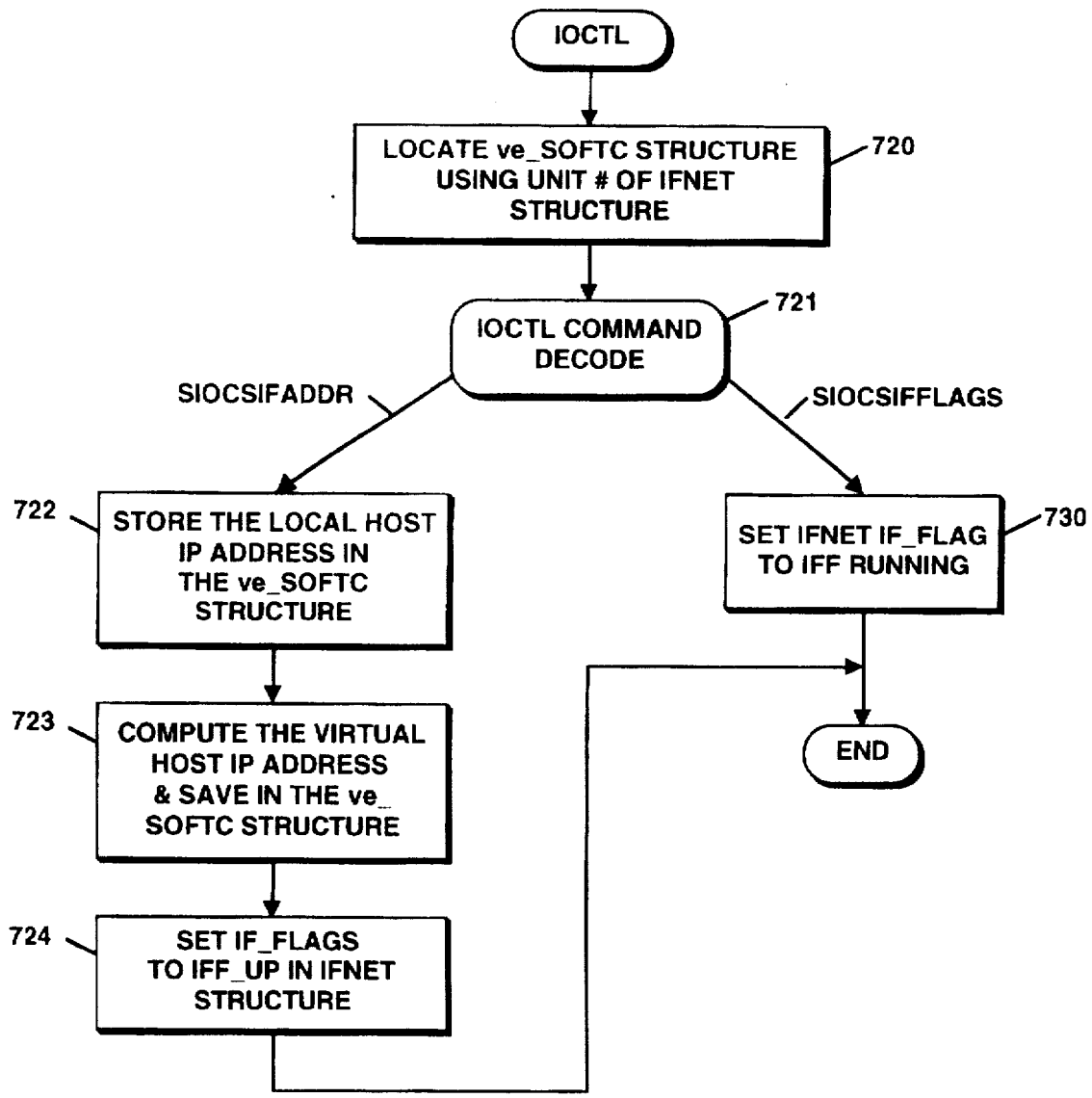

Next, as part of the initialization sequence, the host system executes an ioctl command (i.e., SIOCSIFADDR) as indicated in FIG. 7b. This command is used to set the network interface address. As indicated in block 720, the ioctl command adds the IP address (e.g. 215.65.43.1) to the arpcom control structure. This local IP address which is used for mapping, is saved in the local IP address portion of the structure ve__softc of FIG. 5 as indicated in block 720. The system also computes the network and host portions for the virtual host system 100-4a, as indicated in block 722.

In the preferred embodiment, as discussed above, the virtual host IP address for virtual host ve0 is generated by adding one to the local host IP address (i.e., 215.65.43.1). The resulting value (i.e., 215.65.43.2) for virtual host 100-4a is saved in the virtual host IP address portion of the control structure ve__softc of FIG. 5. Next, as indicated in block 724, the host system sets the IFF__UP flag of the if__flags field of the ifnet structure for the virtual network mechanism 100 to a state which indicates that the interface is "up."

As seen from FIG. 7b, a second type of ioctl command (i.e., SIOCSIFFLAGS) is executed which sets the interface IFF__RUNNING flag to indicate that the interface is "running." This enables the allocation of resources by the system which places the virtual network mechanism 100 in an operative (running) state as indicated in block 730. The above sequence of operations of FIGS. 7a and 7b is repeated for each of the other configured virtual host systems 100-4b through 100-4d.

Referring to FIG. 6, once initialization has been completed, the virtual network mechanism 100 is ready to receive packets from remote system 20 specifying any one of the virtual host systems ve0-ve3. As discussed above, the remote system 20 sends packets to the host having IP address 215.65.43.1 via the IP module of local host system 54 which operates as a "gateway." That is, the IP module receives each data packet and determines that the data packet should be routed to one of the virtual host systems ve0-ve3 through the virtual network interface as specified by the local host IP address.

The IP module of host system 54 determines the IP address of the virtual host system (interface 100-2) from the system network list. The IP module/layer then invokes/calls the virtual host output routine using the previously stored output0 routine address (see block 704 of FIG. 7a) contained in the ifnet structure associated with the designated virtual host system (e.g. ve0, ve1, ve2 or ve3). The IP module includes in the call, all of the parameters required for processing the included packet by mechanism 100. The call includes as a parameter, an address pointer to ifnet structure associated with the specific virtual host system. As indicated in block 604, mechanism 100 accesses the ifnet structure to obtain the unit number value designating the ve__softc control structure associated with the designated virtual host system.

As indicated in block 620 of FIG. 6, the mechanism 100 processes the physical network (e.g. Ethernet) header in a standard manner. Next, as indicated in block 608, the mechanism 100 verifies the IP and TCP packets to ensure that they have no errors. As indicated in block 610, the mechanism 100 next tests the protocol type value to determine what type of network protocol is being used.

As indicated above, it may be desirable to utilize multiple virtual host systems to take advantage of multiple processor resources of a multiprocessor system. In such cases, it is only necessary to provide one type of protocol, such as a specific Ethernet protocol. In other instances, multiple virtual host systems may be used to operate in conjunction with different types of physical networks, such as Ethernet, Token Ring, FDDI, etc. or operate in conjunction with different protocols of a specific type of physical network, such as Ethernet. From an implementation point of view, it may be desirable to utilize a separate virtual LAN for each different physical network media (e.g. Ethernet, Token Ring, FDDI). In this instance, it is necessary to replicate virtual network interface 100-2 within each virtual LAN and assign each such network interface, a different local host IP address value.

For ease of explanation, it is assumed that each of the virtual host systems 100-4a through 100-4d provide different types of Ethernet protocols. If it is a specific one of the types of Ethernet protocol (i.e., has a hexadecimal value of 800), then the mechanism 100 next checks for the type of IP protocol by examining a type field contained in the IP packet. If it is not a specific Ethernet protocol, then the mechanism 100 drops the packet as indicated in block 612.

As indicated in blocks 616 and 618, when the IP protocol type field specifies ICMP, the mechanism 100 performs echo processing wherein it echoes the packet and then calls the kernel services function find_input_type0. This function automatically deposits the packet into the IP module. When the IP protocol type field specifies TCP, then the mechanism 100 determines if the packet originated from a local or remote host system as indicated by block 620. When the packet originates from a local host, mechanism 100 invokes the outbound function as indicated in block 622. When the packet originates from a remote host, mechanism 100 invokes the inbound function as indicated in block 630.

Figure 7D:
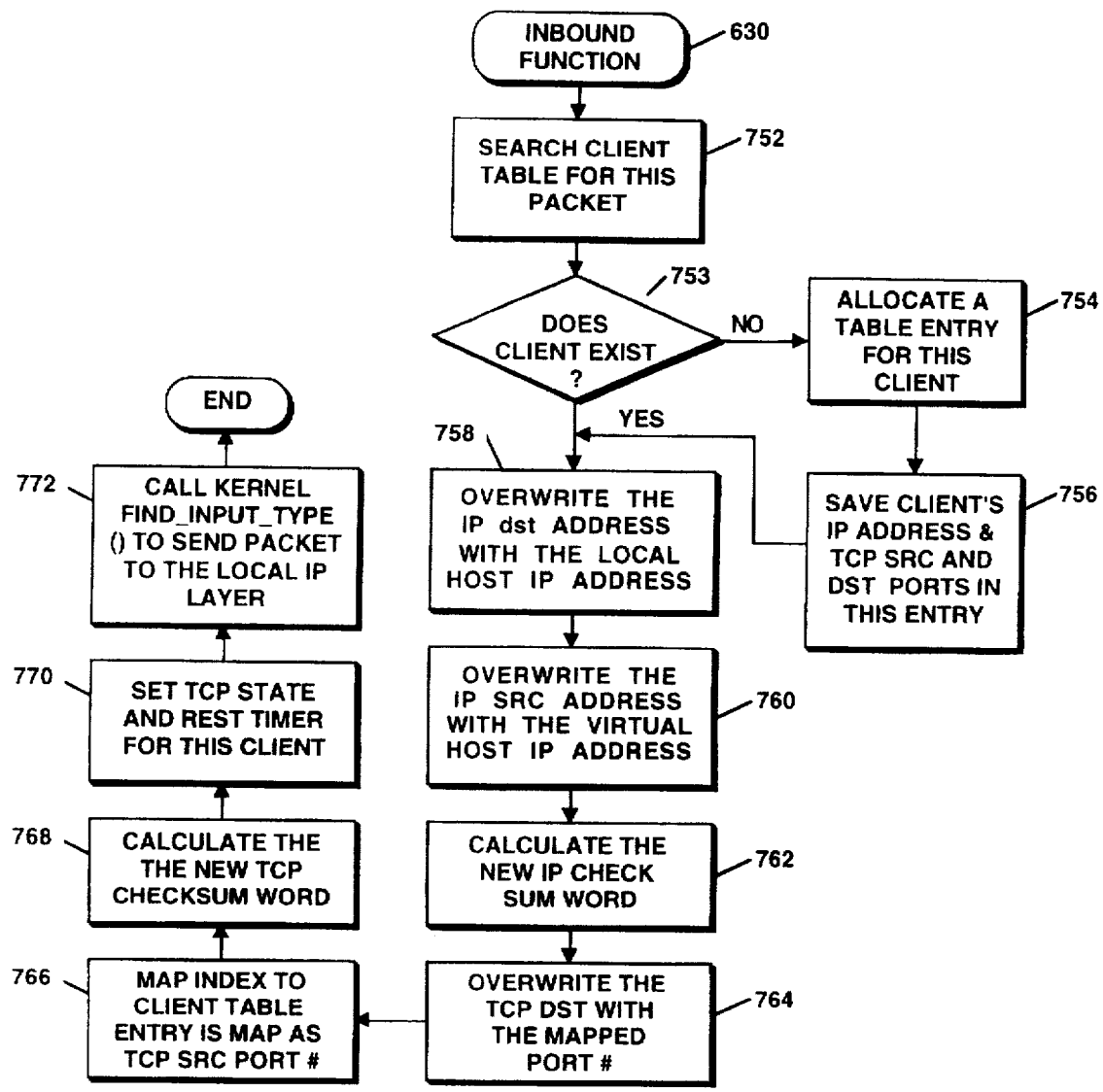
Figure 7E:
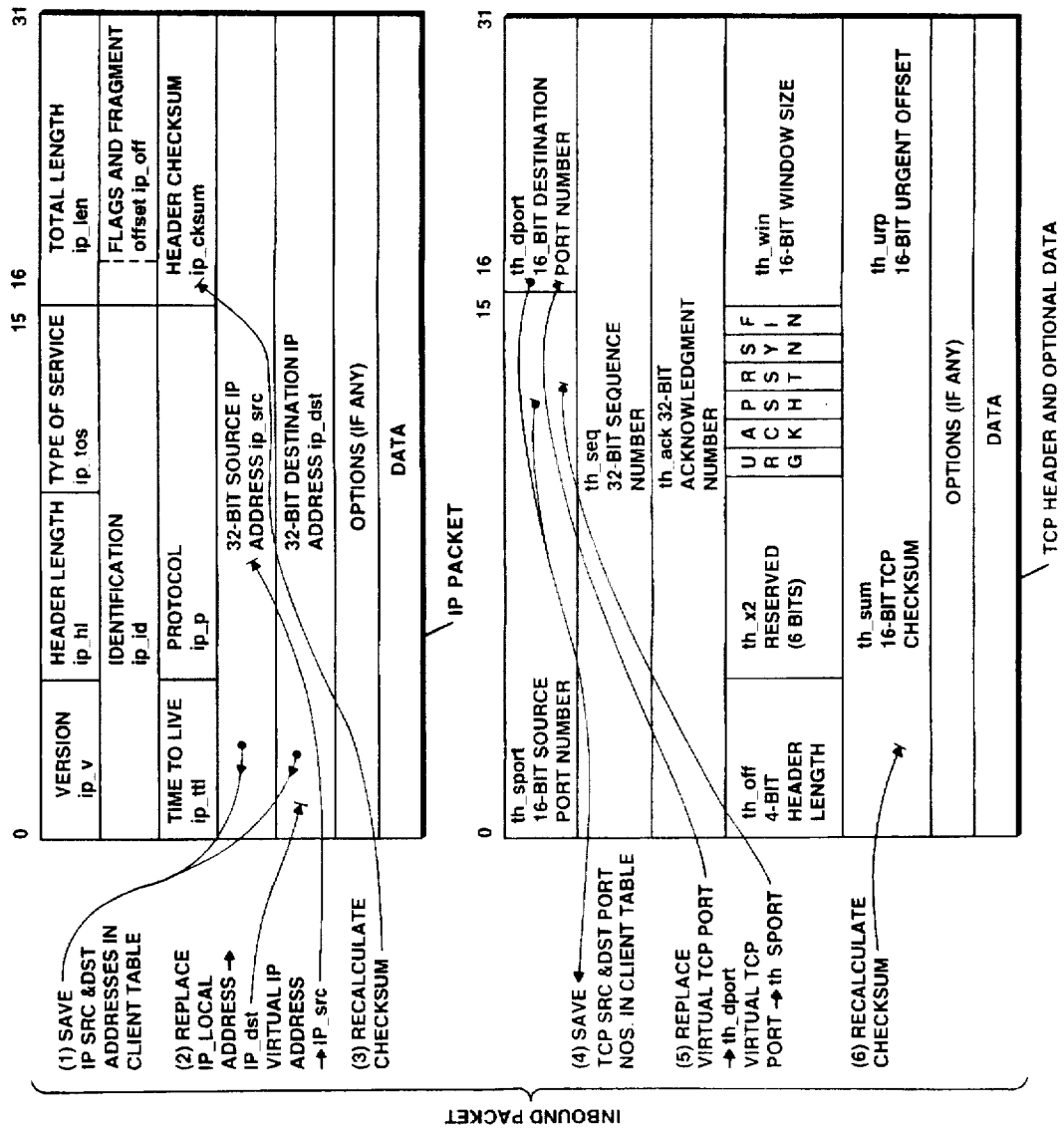

The inbound function is shown in greater detail in FIG. 7d. As indicated in block 752 of FIG. 7d, mechanism 100 searches the set of virtual host client table(s) for this packet. As discussed, this involves searching up to 512 client tables to make certain that the client/user exists (i.e., a client table was opened/allocated for that particular client). If mechanism 100 determines that the client does not exist (per block 752), then mechanism 100 allocates a table entry for the client as indicated in block 754. More specifically, mechanism 100 establishes a client table entry for that client such as shown in FIG. 5 and increments the client_count field by one. As indicated in block 756, the mechanism 100 saves the 32-bit client source IP address (ip_src), the 32 bit destination IP address (ip_dst) and 16 bit TCP source port (th_sport) and destination port (th_dport) numbers such as indicated in FIG. 7e.

Next, as indicated in block 758, mechanism 100 overwrites the destination IP address (ip_dst) with the value obtained from the local host IP address field previously stored in the control structure ve_softc of FIG. 5. Now, the packet identifies the local host as the destination so that the packet will be processed by the host IP module. Mechanism 100 then overwrites the source IP address (ip_src) with the uniquely assigned value obtained from the virtual host IP address field of control structure ve_softc associated with the particular virtual host system as indicated in block 760. This now identifies mechanism 100 as the source of the packet so that any response by the ES FTP services application server will be returned back to mechanism 100/virtual host system for rerouting back to the original source, remote system 20. The mechanism 100 next recalculates a new IP checksum word (ip_cksum) which is overwritten into the IP packet header checksum field of FIG. 7e as indicated in block 762.

Next, mechanism 100 overwrites the "well-known" TCP destination port number (th_dport) with the mapped port number value as indicated in block 764. The mapped port number value is a port number which identifies the ES FTP application server 22 of FIG. 2. The mechanism 100 maps the well-known port number into a non-well-known port number value. The mapping is carried out in a relatively simple matter for example, the well-known port number value "21" is changed to "5021." It will be appreciated that the ES FTP application server 22 will have been previously configured to listen on port "5021" instead of the well-known port "21". This is done by entering the value "5021" into the appropriate services file. It will be noted that each of the other virtual host systems will have a unique mapped value. For example, the mapped values for virtual host systems ve1, ve2 and ve3 for the well-known port number value "21" may correspond to "6021," "7021" and "8021," respectively. It will be appreciated that any value could have been used as the mapped value. For tracking purposes, it is advantageous to select a value which also contains the well-known port number value. This simplifies and speeds up the mapping process which can be implemented as a masking operation, eliminating the need to account for carries, borrows, etc.

Next, as indicated in block 766, mechanism 100 maps the index value obtained from the client table pointer field of the particular virtual host control structure ve_softc as the TCP source port number (th_sport). The index value (e.g. ZERO initially) is used to overwrite the th_sport field of the TCP header of the packet as indicated in FIG. 7e. This virtual port number is used as a temporary port number which provides an index associated with the particular client/user table. Mechanism 100 is able to use the virtual source port number as an index into the client/user tables. This index number arrangement facilitates packet processing by reducing the amount of search time in locating the appropriate client information for the reply packet.

Mechanism 100 then calculates a new TCP checksum as indicated in block 768 and uses the sum to overwrite the th_sum portion of the packet TCP header as indicated in FIG. 7e. Next, mechanism 100 sets the top state filed to an appropriate state in the client table structure which enables mechanism 100 release the client table entry. Also, mechanism 100 resets the timer count word to zero as indicated in block 770. Following the completion of the operations of block 770, mechanism 100 calls the kernel services find_input_type0 function. The call includes all of the parameters required for sending the modified packet to the host system IP layer/module.

It will be noted that the only portions of the inbound packet which are modified are the source IP address and destination IP address as well as the TCP source and destination port number values. The remaining portion of the packet are maintained as the same. Mechanism 100 recalculates the checksums to reflect these modifications and stores the new checksum values to the TCP and IP headers of the packet. Because of the minimal changes made, mechanism 100 is able to carry out these operations within a minimum amount of time.

The host IP module upon receiving the mapped packet from mechanism 100 determines from the source IP local address that the packet is for host system 54. The IP module processes the packet and send it to the TCP layer which forwards the packet to the EX FTP application server 22 as designated by virtual destination port number (th_dport) which corresponds to the value "5021" in the example.

After the ES FTP application server 22 processes the packet, it normally generates a response/reply packet in a conventional manner. This packet is also formatted as shown in FIG. 7g which is the same as the format of FIG. 7e. Here, the server 22 includes the same virtual source and destination port numbers in the packet's TCP header in addition to including the same source IP and destination IP addresses. Since the server 22 is the source of the response packet, the sets of values are reversed to indicate server 22 as the source or sender of the response packet and mechanism 100 as the destination or recipient of the response packet.

The host TCP/IP stack passes the response packet through both the TCP and IP layers/modules for processing in a conventional manner which results in the packet being forwarded to the designated virtual host/mechanism 100 in accordance with the specified packet virtual IP destination address.

As indicated in FIG. 6, the IP module passes the packet to the designated virtual host system by invoking the output0 function in the same manner described above. Briefly, the IP module passes all required arguments/parameters including the specified ifnet structure pointer. Mechanism 100 again performs the operations of blocks 606 through 620. When mechanism 100 checks the originator of the packet, as indicated in block 620, it determines that the response packet is from local host system 54. This causes mechanism 100 to invoke the outbound function of block 622. This function is shown in greater detail in FIG. 7f.

Figure 7F:
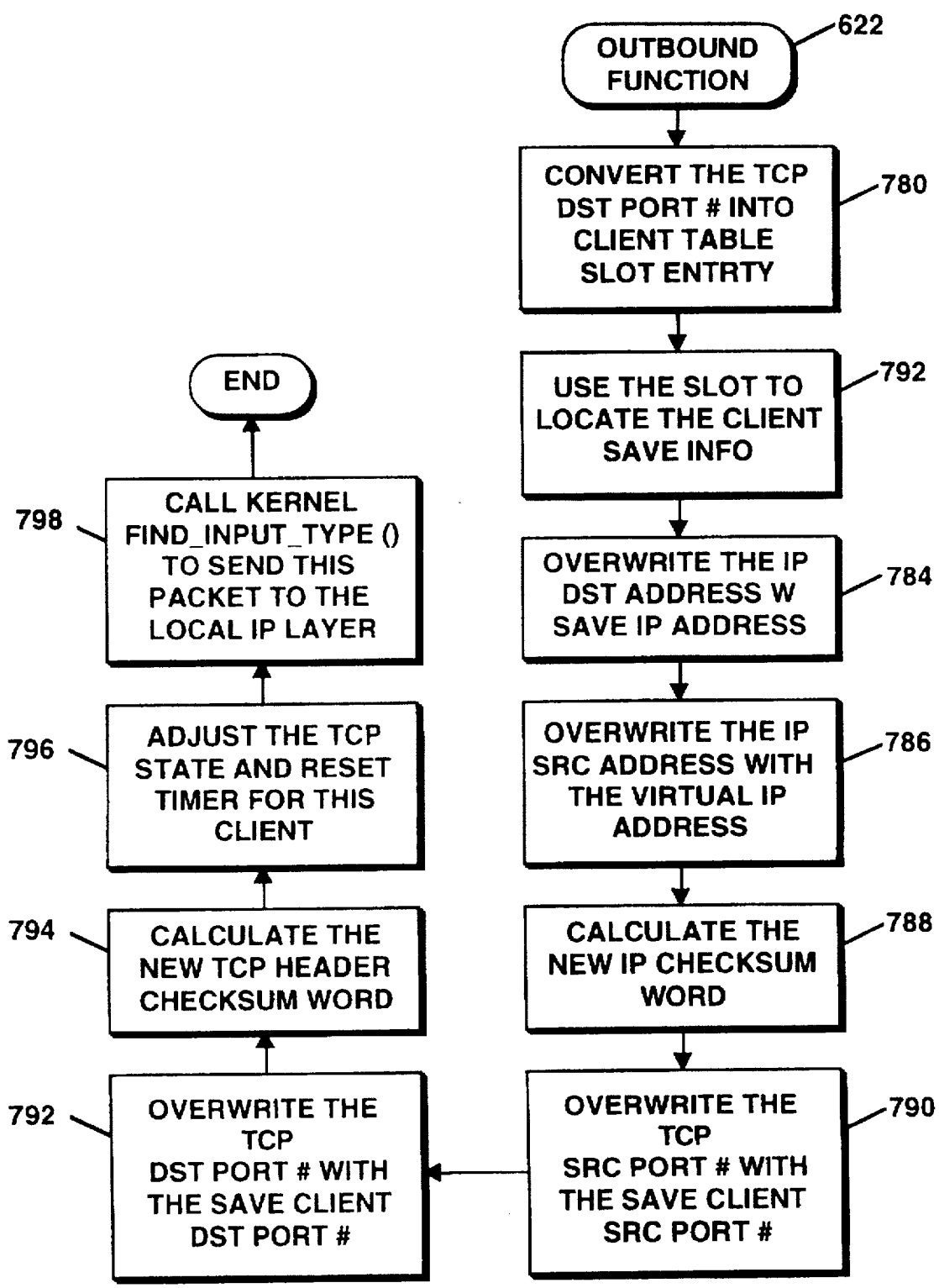
Figure 7G:
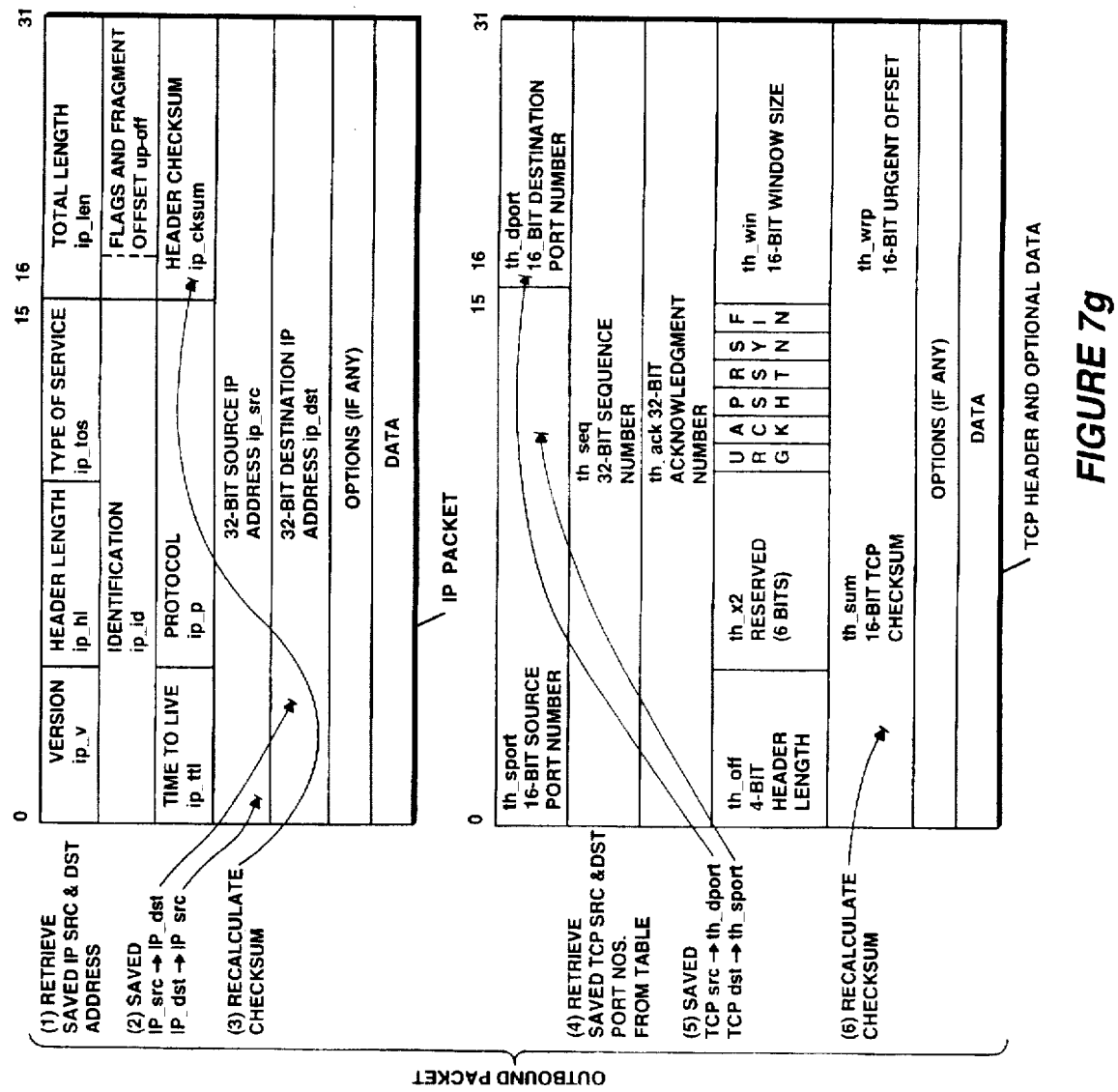

Referring to FIG. 7f, as indicated in block 780, mechanism 100 converts the virtual TCP destination port number (th_dport) assumed initially to have the value of zero, into the client table slot entry. It uses this value as an index to obtain the previously saved client information (i.e., stored in the allocated client table structure of FIG. 5b) as indicated in block 782. In this example, the zero index value is used to locate the associated client table structure. Mechanism 100 retrieves the saved client IP address stored in the client table structure.

As indicated in block 784, mechanism 100 overwrites the destination IP address (ip_dst) of the packet IP header with the saved source IP address identifying the remote host system 20 as the destination for the packet. Next, as indicated in block 786, mechanism 100 overwrites the source IP address (ip_src) with the saved virtual host IP address identifying virtual host system/network mechanism 100 as the source of the packet so that subsequent packets will be routed through mechanism 100. As indicated in block 788, mechanism 100 calculates a new IP checksum word and overwrites the checksum into the IP header checksum portion (ip_cksum) of the response packet.

Mechanism 100 then retrieves the saved client TCP source (src) port and destination (dst) port numbers from the client table structure of FIG. 5. As indicated in block 790, mechanism overwrites the TCP destination port number information (th_dport) contained in the response packet's TCP header with the previously saved client source port number. This change now identifies the remote host system 20 TCP layer as the destination for the response packet. Next, as indicated in block 792, mechanism overwrites the response packet's TCP source port number information (th_sport) contained in the packet's TCP header with the previously saved client destination port number value (client TCP dst port). With this change, the response packet now identifies the virtual host system/mechanism 100 as the source of the response packet.

Again, as indicated in block 794, mechanism 100 calculates a new TCP header checksum word which is used to overwrite the TCP checksum (th_sum) value contained in the response packet TCP header as indicated in FIG. 7g. Mechanism 100 adjusts the tcp_state value contained in the client table structure of FIG. 5b as indicated in block 796. It also resets to zero, the timer count word contained in the client table structure. As indicated in block 798, mechanism 100 calls the kernel services function find_input_type0 which sends the response packet to the local host IP module. The IP module based upon the IP address automatically routes the response packet to the remote host system 20 via local area network 18.

Subsequent packets sent by the client application program of remote host system 20 are automatically routed to the particular virtual host system/mechanism 100 which processes each packet through the inbound function in the manner indicated in FIG. 7d. Since mechanism 100 previously allocated a table entry to the remote system client application program, the operation of block 754 is omitted. Similarly, any packets returned by the ES FTP application server 22 are processed by mechanism 100 through the outbound function in the manner indicated in FIG. 7g.

If for any reason, the client application program fails to send packets for a long period of time because of a line disconnect or similar condition, mechanism 100 allows the continued incrementing of the timer count word without resetting same. Therefore, when mechanism 100 initiates a scan of the virtual host system's client table structures, it detects that the timer count word of the client table structure associated with the client application program will have exceeded a predetermined count indicating lack of activity. In such instances, mechanism 100 deallocates or clears the client table structure entry thereby freeing up space and eliminating stale entries.

Figure 8:
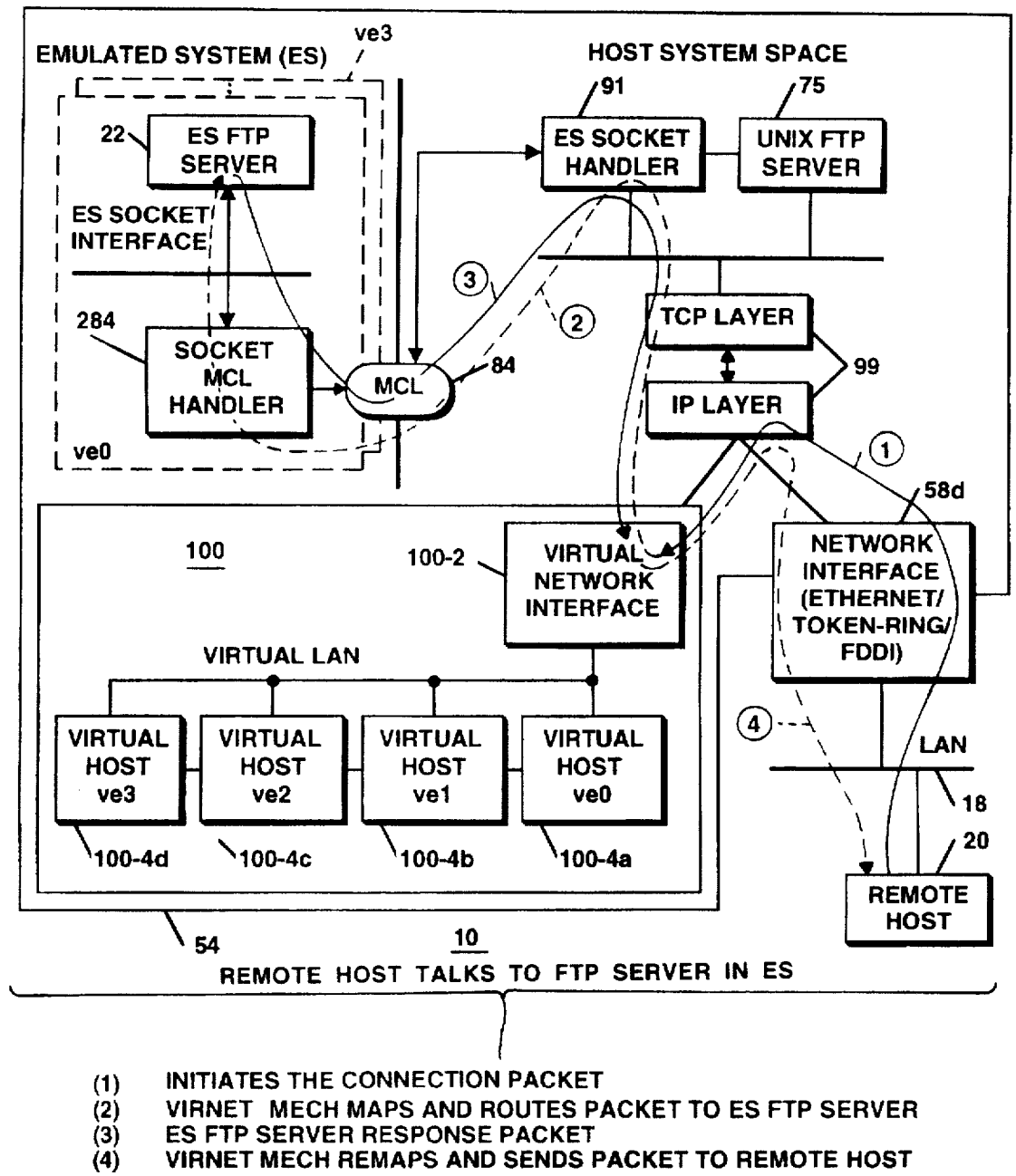

FIG. 8 illustrates diagrammatically, the overall operation of the mechanism of the present invention. As shown, remote host system 20 initiates a connection with ES FTP application server 22 through a connection packet which is indicated by the path labeled "1." Next, mechanism 100 maps the connection packet and routes the packet to the server 22 as indicated by the path labeled "2." Any response packets from server 22 are sent to mechanism 100 as indicated by the path labeled "3." Mechanism 100 remaps each such response packet and sends it to the remote host system 20 as indicated by the path labeled 4.

From FIG. 8 and the above descriptions, it is seen how the mechanism of the present invention allows host and hosted system application programs executable by multiple emulating hosted operating systems/virtual host systems sharing a single host TCP/IP communications network stack to use the same well-known port without having to make any changes in client application programs. The mechanism of the present invention by operating below the IP layer of a network stack is able to take advantage of the routing capabilities of the IP layer/module. This minimizes the amount of software required to be added to the host operating system facilities in incorporating the virtual network mechanism of the present invention.

Those skilled in the art will appreciate that many changes may be made to the preferred embodiment of the present invention without departing form its teachings. For example, as previously described, the present invention can be utilized with different types of communication network protocols, such as Ethernet, Token-Ring, FDDI, etc. Also, the present invention could also utilize other types of mapping techniques to generate the required virtual identifier information utilized in conjunction with the forwarding of packets through the TCP/IP network protocol stack. Other modifications of this type relative to protocols, data structure formats, operating system facilities/calls and the like will also occur to those skilled in the art. Further, the present invention is not limited to a particular kind of upper layer software. It is only significant that such software contain the proper routing capabilities.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A method which allows a local host system to share a network software facility of the local host system operating system between a number of application servers operating under the host operating system and a corresponding number of application servers operating under components of a plurality of hosted operating systems running under control of the local host operating system, the local host system being coupled to at least one remote host system through a local area network (LAN) and an internetwork, the network software facility being coupled to a network interface unit which includes interfacing hardware and software for connecting the local host system to the LAN for communicating with the remote host system using a standard communications network protocol which is characterized by assigning different station address identifier values to each host system and well-known services function identifier values to the different data communications application servers associated with local host system and hosted operating systems so that servers performing the same service function are assigned the same well-known services function identifier value for directing incoming packets sent by the remote host system to the appropriate application server, said method comprising the steps of:

(a) configuring a virtual network mechanism within the local host operating system to be operatively coupled to the host operating system network software facility through a plurality of network interface structures to function as a virtual LAN connected to a plurality of virtual host systems running the hosted operating system with each virtual host system operating as if it contained its own network software facility;

(b) preallocating memory and initializing a different set of structures in preallocated memory for each of the plurality of virtual host systems which operate in conjunction with the virtual network mechanism and the plurality of hosted operating systems, each different set of structures containing a unique unit number identifying the virtual host systems associated therewith and a unique IP address designating the particular virtual host system within the virtual LAN;

(c) mapping predetermined portions of each incoming packet by the virtual network mechanism sent by the remote host system and received from the local host communications network software facility by changing the station address identifier value of each incoming packet to specify the local host system as a destination and the particular virtual host system as a source of the packet for returning any reply packet and changing the well-known services identifier value to a virtual host identifier value so that the packet received from the virtual network mechanism is directed by the network software facility to the appropriate application server of the designated one of the plurality of hosted operating system for processing; and, (d) remapping the predetermined portions of each outgoing reply packet sent by a hosted system application server through the network software facility to the particular virtual host system by restoring the remote host station address identifier and well-known service identifier values so each outgoing reply packet sent by the virtual network mechanism to the internetwork appears to the remote host system as a reply packet to the communication between the remote host system and the hosted system application server as if the server had been reached through the LAN using the originally sent station address assigned to the particular hosted operating system with the well-known services identifier value.

2. The method of claim 1 wherein the virtual network mechanism includes interfacing software similar to the network interface unit and a common set of software routines utilized by each of the plurality of virtual host systems.

3. The method of claim 2 wherein the network software facility includes a TCP/IP protocol stack containing TCP and IP layers and the virtual network mechanism utilizes the network routing capabilities of the IP layer.

4. The method of claim 1 wherein the standard communications network protocol is the TCP/IP protocol, the station address identifier value corresponds to an IP address containing IP source and IP destination addresses and the well-known service function identifier value corresponds to a TCP well-known port number value containing TCP source and TCP destination port numbers.

5. The method of claim 1 wherein configuring step (a) of the method includes the step of:

(d) loading and initializing each of the plurality of hosted operating systems using a number of directives.

6. The method of claim 1 wherein each different set of structures includes predetermined types of control data structures including a first structure which defines the existence of the particular virtual host system to the network software facility and a second structure which defines the virtual host system.

7. The method of claim 6 wherein the first structure includes a plurality of fields, a first field containing a name which identifies the virtual host system and a second field designating the second structure associated with the virtual host system.

8. The method of claim 6 wherein the first structure is an interface network structure utilized by the host operating system and the second structure is a software control structure which is used to manage packet processing for each of the client application programs running on the remote host system accessing application services running on that particular virtual host system.

9. The method of claim 7 wherein the predetermined types of control data structures includes a number of client table structures, each client table structure being associated with a different client application program of the remote host system which has established communication with a particular virtual host system.

10. The method of claim 9 wherein a new client table is assigned by the particular virtual host system each time a connection packet is sent by a different client application program running on the remote host system.

11. The method of claim 10 wherein the remote host system establishes connection with the hosted operating system data communication services application servers of the plurality of virtual host systems by configuring the remote host to have the local host system function as a "gateway" so that the local host system communications network software facility automatically routes incoming packets sent by the remote host system to designated ones of the virtual host systems.

12. The method of claim 10 wherein the client table of each set of structures includes a predetermined number of fields, a first field for storing the station address identifier value of the remote system client application program, a second field defining the operational state of the client table, third and fourth fields for defining different client application program port identifier values and a fitch field for storing a timer count value defining client application program activity.

13. The method of claim 8 wherein the second structure contains a predetermined number of fields, a first field designating the name of the virtual host system, a second field for storing the state of the virtual host system, a third field for maintaining a count of the number of different client entries being managed by the virtual network mechanism, fourth and fifth fields for storing the common local host and unique virtual host station address identifier values respectively and a sixth field for storing a client pointer value for accessing the first client table structure generated by the virtual host system.

14. The method of claim 13 wherein the virtual host station value for a first one of the virtual host systems is generated by performing an arithmetic operation on the common local host station address identifier value.

15. The method of claim 1 wherein each virtual host system is used to process packets transmitted utilizing one of a number of protocols defining a predetermined type of standard protocol.

16. The method of claim 1 wherein the method further includes the step of:

(f) saving the station address identifier value of the remote host system and the well-known services identifier value contained in each incoming packet in a client table structure generated by the particular virtual host system which can be indexed through the virtual identifier in response to having received an initial connection packet from a client application program running on the remote host system for enabling the subsequent mapping of each reply packet.

17. The method of claim 1 wherein the mapping step (a) of the method includes the step of mapping the well-known services identifier value to a non-well-known services identifier value containing the well-known services identifier value.

18. A virtual network mechanism which allows a local host system to share a network software facility of the local host system operating system between a number of data communications application servers operating under the host operating system and a corresponding number of application servers operating under components of a plurality of hosted operating systems running under control of the local host operating system, the local host system being coupled to at least one remote host system through a local area network (LAIN) and an internetwork, the network software facility being coupled to a network interface unit which includes interfacing hardware and software for connecting the local host system to the LAN for communicating with the remote host system using a standard communications network protocol which is characterized by assigning different station address identifier values to each host system such that the local host system and hosted operating systems are assigned different station addresses and well-known services function identifier values to the different data communications application servers associated with local host system and each of the plurality of hosted operating systems so that servers performing the same service function are assigned the same well-known services function identifier value for directing incoming communication data packets sent by the remote host system to the appropriate communications application server running on the particular hosted operating system, said mechanism comprising:

(a) an interface component configured within the local host operating system to operatively couple the virtual network mechanism to the host operating system communications network software facility as a virtual LAN connected to a plurality of virtual host systems which are the components of the plurality of hosted operating systems;

(b) an initialization component for preallocating and initializing a different set of structures for each of the plurality of virtual host systems which operate in conjunction with the virtual network mechanism and the plurality of hosted operating systems, each different set of structures being initialized to contain a unique number value identifying a particular one of the virtual host systems and a unique IP address designating the virtual host system on the virtual LAN;

(c) a first mapping component coupled to the interface component for mapping predetermined portions of each incoming packet sent by the remote host system and received from the interface component through the local host network software facility so that the station address identifier value of each incoming packet is changed to specify the common local host system as a destination and the particular virtual host system as a source of the packet for processing each reply packet and the well-known services identifier value is changed to a virtual identifier value so that the packet received from the virtual network mechanism is directed by the network software facility to the appropriate application server of the designated hosted operating system for processing; and, (d) a second mapping component for mapping the predetermined portions of each outgoing reply packet sent by a hosted system communications application server through the network software facility to the interface component by restoring the remote host station address identifier and well-known service identifier values so each outgoing reply packet sent by the virtual network mechanism to the internetwork appears to the remote host system as a reply packet to the communication initiated by a client application program running on the remote host system and the hosted system application server as if the server had been accessed through the LAN using the originally sent station address assigned to the particular hosted operating system by the well-known services identifier value.

19. The mechanism of claim 18 wherein each set of control structures includes a first structure which defines the existence of the virtual host system to the network software facility and a second structure which defines the virtual host system operational status.

20. The mechanism of claim 19 wherein the first structure is an interface network structure utilized by the host operating system to communicate with the virtual host system network facility and the second structure is a software control structure which the virtual host system uses to manage packet processing for each of the client application programs running on the remote host system., the software control structure containing a predetermined number of fields, a first field designating the name of the virtual host system, a second field for storing the state of the virtual host system, a third field for maintaining a count of the number of different client entries being managed by the virtual network mechanism, fourth and fifth fields for storing the common local host and unique virtual host station address identifier values respectively and a sixth field for storing a client pointer value for accessing the first client table structure generated by the virtual host system.

* * * * *